United States Patent [19]
Kashima

[11] Patent Number: 5,997,979
[45] Date of Patent: Dec. 7, 1999

[54] SPHERICAL ANNULAR SEAL MEMBER AND METHOD OF MANUFACTURING THE SAME

[75] Inventor: Kazutsugu Kashima, Fujisawa, Japan

[73] Assignee: Oiles Corporation, Tokyo, Japan

[21] Appl. No.: 08/882,225

[22] Filed: Jun. 24, 1997

[30] Foreign Application Priority Data

Jun. 27, 1996 [JP] Japan ................................ 8-186783
Jun. 27, 1996 [JP] Japan ................................ 8-186784

[51] Int. Cl.$^6$ .................................................. F16J 15/12
[52] U.S. Cl. .................... 428/66.4; 277/602; 277/626; 277/627; 277/946; 428/66.2; 428/66.6
[58] Field of Search ........................ 428/66.4, 66.6, 428/66.2; 277/100, 227, 229, 235 R, DIG. 6, 626, 627, 602, 946, FOR 238

[56] References Cited

U.S. PATENT DOCUMENTS

| | | | |
|---|---|---|---|
| 4,209,177 | 6/1980 | Hall | 277/101 |
| 4,417,733 | 11/1983 | Usher | 277/1 |
| 4,462,603 | 7/1984 | Usher et al. | 277/230 |
| 4,516,782 | 5/1985 | Usher | 277/1 |
| 4,547,434 | 10/1985 | Sumiyoshi et al. | 428/609 |
| 4,551,393 | 11/1985 | Sumiyoshi et al. | 428/609 |
| 4,559,248 | 12/1985 | Sumiyoshi et al. | 277/12 |
| 4,559,249 | 12/1985 | Arigaya et al. | 277/12 |
| 4,607,851 | 8/1986 | Usher | 277/1 |
| 4,762,330 | 8/1988 | Lönne et al. | 277/230 |
| 4,871,181 | 10/1989 | Usher et al. | 277/229 |
| 4,902,024 | 2/1990 | Takenoshita | 277/204 |
| 4,951,954 | 8/1990 | MacNeill | 277/230 |
| 5,040,805 | 8/1991 | Ozora | 277/235 R |
| 5,065,493 | 11/1991 | Ozora | 29/505 |
| 5,499,825 | 3/1996 | Maeda et al. | 277/100 |

FOREIGN PATENT DOCUMENTS

0 453 068   10/1991   European Pat. Off. .
58-24620    2/1983    Japan .
58-34230    2/1983    Japan .

*Primary Examiner*—Nasser Ahmad
*Attorney, Agent, or Firm*—Nixon & Vanderhye P.C.

[57] ABSTRACT

A spherical annular seal member which has a cylindrical inner surface defining a through hole in a central portion thereof as well as an outer surface formed in the shape of a partially convex spherical surface, and which is used particularly in an exhaust pipe joint, includes: a reinforcing member made from a compressed metal wire net; a heat-resistant material filling meshes of the reinforcing member and compressed in such a manner as to be formed integrally with the reinforcing member in mixed form, the heat-resistant material and the reinforcing member being provided as principal components in an interior portion of the spherical annular seal member which extends from the cylindrical inner surface to a vicinity of the outer surface formed in the shape of the partially convex spherical surface, aluminum phosphate being also formed integrally with the reinforcing member and the heat-resistant material in mixed form; a sliding layer formed of a lubricating composition which is constituted of boron nitride and at least one of alumina and silica, the sliding layer being disposed as a surface layer of the spherical annular seal member which extends from the vicinity of the outer surface formed in the shape of the partially convex spherical surface to the outer surface formed in the shape of the partially convex spherical surface; and a reinforcing member disposed in the sliding layer and made from a compressed metal wire net formed integrally with the sliding layer in mixed form, wherein the outer surface formed in the shape of the partially convex spherical surface where the sliding layer and the reinforcing member made from the metal wire net formed integrally with the sliding layer in mixed form are exposed is formed into a smooth surface.

46 Claims, 7 Drawing Sheets

SPHERICAL ANNULAR SEAL MEMBER AND METHOD OF MANUFACTURING THE SAME

BACKGROUND OF THE INVENTION

The present invention relates to a spherical annular seal member used in a spherical pipe joint for an automobile exhaust pipe.

As a spherical annular seal member used in a spherical pipe joint for an automobile exhaust pipe, one disclosed in, for example, Japanese Patent Application Laid-Open No. 76759/1979 is known. The seal member disclosed in this publication is heat resistant, excels in affinity with a mating member, and has remarkably improved impact strength, but has a drawback in that the seal member often generates abnormal noise when it undergoes friction under dry frictional conditions. The drawback of this seal member is conceivably attributable to, among others, the fact that there is a large difference between the coefficient of static friction and the coefficient of dynamic friction of a heat-resistant material, such as expanded graphite, for forming the seal member, and to the fact that the frictional resistance of the seal member constituted by this heat-resistant material exhibits negative resistance with respect to the sliding speed.

Therefore, to overcome the above-described drawback, a seal member disclosed in Japanese Patent Application Laid-Open No. 123362/1994 (corresponding to U.S. Pat. No. 5,499,825) was proposed. This seal member excels in the sealing characteristic without generating abnormal frictional noise in friction with a mating member, and satisfies the performance required of a seal member.

However, with respect to this proposed seal member as well, a new problem has been presented which is attributable to, among others, the improvement in recent years of the performance of automobile engines. That is, the conventional seal members are unable to satisfy the conditions of use in the light of heat resistance, owing to an increase in the exhaust-gas temperature due to the improved performance of the automobile engines, or owing to an increase in the exhaust-gas temperature attributable to the fact that the spherical pipe joint is located closer to the engine side in a case where the spherical pipe joint is disposed in the vicinity of a manifold, i.e., an outlet of the exhaust gases, for the purpose of improving the noise, vibration and harshness (NVH) characteristics of an automobile. Thus, there has been a compelling need for improvement of the heat resistance of the seal member itself.

SUMMARY OF THE INVENTION

The present invention has been devised in view of the above-described problems, and its object is to provide a spherical annular seal member for use in a spherical pipe joint for an automobile exhaust pipe, which does not generate abnormal frictional noise, excels in a sealing characteristic, and is capable of satisfying its function as a seal member even under a high-temperature condition of 600° C. to 700° C., while utilizing the technique disclosed in Japanese Patent Application Laid-Open No. 123362/1994, as well as a method of manufacturing the same.

In accordance with the present invention, the above object is attained by a spherical annular seal member which has a cylindrical inner surface defining a through hole in a central portion thereof as well as an outer surface formed in the shape of a partially convex spherical surface, and which is used particularly in an exhaust pipe joint, comprising: a reinforcing member made from a compressed metal wire net; a heat-resistant material filling meshes of the reinforcing member and compressed in such a manner as to be formed integrally with the reinforcing member in mixed form, the heat-resistant material and the reinforcing member being provided as principal components in an interior portion of the spherical annular seal member which extends from the cylindrical inner surface to a vicinity of the outer surface formed in the shape of the partially convex spherical surface, aluminum phosphate being also formed integrally with the reinforcing member and the heat-resistant material in mixed form; a sliding layer formed of a lubricating composition which is constituted of boron nitride and at least one of alumina and silica, the sliding layer being disposed as a surface layer of the spherical annular seal member which extends from the vicinity of the outer surface formed in the shape of the partially convex spherical surface to the outer surface formed in the shape of the partially convex spherical surface; and a reinforcing member disposed in the sliding layer and made from a compressed metal wire net formed integrally with the sliding layer in mixed form, wherein the outer surface formed in the shape of the partially convex spherical surface where the sliding layer and the reinforcing member made from the metal wire net formed integrally with the sliding layer in mixed form are exposed is formed into a smooth surface.

In addition, in accordance with the present invention, the above object is also attained by the above-described spherical annular seal member wherein, in the interior portion extending from the cylindrical inner surface to the vicinity of the outer surface formed in the shape of the partially convex spherical surface, at least one of graphite and a metal fluoride is integrally provided in mixed form in addition to aluminum phosphate, the reinforcing member, and the heat-resistant material.

In addition, in accordance with the present invention, the above object is also attained by a spherical annular seal member which has a cylindrical inner surface defining a through hole in a central portion thereof as well as an outer surface formed in the shape of a partially convex spherical surface, and which is used particularly in an exhaust pipe joint, comprising: a heat-resistant sheet member having on overall surfaces thereof a heat-resistant coating formed of aluminum phosphate; a reinforcing member made from a metal wire net, the reinforcing member and the heat-resistant sheet member being disposed in an interior portion of the spherical annular seal member which extends from the cylindrical inner surface to a vicinity of the outer surface formed in the shape of the partially convex spherical surface, and being arranged to be provided with structural integrality by being compressed and intertwined with each other; a sliding layer formed of a lubricating composition which is constituted of one of boron nitride and a mixture of boron nitride and polytetrafluoroethylene resin and at least one of alumina and silica, the sliding layer having an exposed surface which constitutes the outer surface formed in the shape of the partially convex spherical surface; and a reinforcing member disposed in the sliding layer and made from a metal wire net formed integrally with the sliding layer, wherein the outer surface formed in the shape of the partially convex spherical surface where the sliding layer and the reinforcing member made from the metal wire net formed integrally with the sliding layer in mixed form are exposed is formed into a smooth surface.

In addition, in accordance with the present invention, the above object is also attained by the above-described spherical annular seal member wherein the heat-resistant coating is formed by a mixture in which at least one of graphite and a metal fluoride is mixed with aluminum phosphate.

Furthermore, in accordance with the present invention, the above object is also attained by a method of manufacturing a spherical annular seal member which has a cylindrical inner surface defining a through hole in a central portion thereof as well as an outer surface formed in the shape of a partially convex spherical surface, and which is used particularly in an exhaust pipe joint, comprising the steps of: (a) preparing a heat-resistant sheet member having on overall surfaces thereof a heat-resistant coating having a uniform thickness and formed of aluminum phosphate; (b) preparing a reinforcing member made from a metal wire net obtained by weaving or knitting fine metal wires, superposing the reinforcing member on the heat-resistant sheet member, and convoluting a superposed assembly of the reinforcing member and the heat-resistant sheet member into a cylindrical shape with the heat-resistant sheet member placed on an inner side, so as to form a tubular base member; (c) preparing another heat-resistant sheet member having on overall surfaces thereof a heat-resistant coating having a uniform thickness and formed of aluminum phosphate, and forming a sliding-surface forming member which includes the another heat-resistant sheet member, a sliding layer coated on a surface of the heat-resistant coating on one surface of the another heat-resistant sheet member and formed of a lubricating composition constituted of one of boron nitride and a mixture of boron nitride and polytetrafluoroethylene resin and at least one of alumina and silica, and a reinforcing member made from a metal wire net disposed in such a manner as to coat the sliding layer; (d) winding the sliding-surface forming member around an outer peripheral surface of the tubular base member with a sliding layer-side surface of the sliding-surface forming member facing an outer side, so as to form a cylindrical preform; and (e) fitting the cylindrical preform over an outer peripheral surface of a core of a die, placing the core into the die, and compression-forming the cylindrical preform in the die in an axial direction of the core, wherein, in an interior portion of an obtained spherical annular seal member, which extends from the cylindrical inner surface to a vicinity of the outer surface formed in the shape of the partially convex spherical surface, the heat-resistant sheet member having the heat-resistant coating and the reinforcing member made from the metal wire net are provided with structural integrality by being compressed and intertwined with each other, and the outer surface formed in the shape of the partially convex spherical surface is formed into a smooth sliding surface in which meshes of the reinforcing member are filled with the lubricating composition such that the reinforcing member and the lubricating composition are formed integrally in mixed form.

In addition, in accordance with the present invention, the above object is also attained by the above-described method of manufacturing a spherical annular seal member wherein the heat-resistant coating provided on the heat-resistant sheet member prepared in the step (a) is formed by a mixture of aluminum phosphate and at least one of graphite and a metal fluoride, the step (b) includes a step of convoluting the heat-resistant sheet member into the cylindrical shape so as to form the tubular base member, and the heat-resistant coating provided on the another heat-resistant sheet member prepared in the step (c) is formed by a mixture of aluminum phosphate and at least one of graphite and a metal fluoride.

In the interior portion of the above-described spherical annular seal member, which extends from the cylindrical inner surface to the vicinity of the outer surface formed in the shape of the partially convex spherical surface, the heat-resistant material and aluminum phosphate are contained in a weight ratio of 2–15 parts of aluminum phosphate to 100 parts of the heat-resistant material.

The heat-resistant sheet member is constituted by a sheet member which is formed from heat-resistant material of at least one kind selected from expanded graphite, mica, and asbestos, and the heat-resistant coating is formed of aluminum phosphate which is formed with a uniform thickness of 0.05–0.3 g/100 cm$^2$ on overall surfaces of the heat-resistant sheet member.

In the interior portion of the above-described spherical annular seal member, which extends from the cylindrical inner surface to the vicinity of the outer surface formed in the shape of the partially convex spherical surface, the heat-resistant material, at least one of graphite and the metal fluoride, and aluminum phosphate may be contained in a weight ratio of 4–40 parts of aluminum phosphate and at least one of graphite and the metal fluoride to 100 parts of the heat-resistant material.

The sliding layer is formed of a lubricating composition which is constituted of 70–90 wt. % of boron nitride and 10–30 wt. % of at least one of alumina and silica, or a lubricating composition in which that lubricating composition is set as 100 parts by weight, and which further contains polytetrafluoroethylene resin in a proportion of not more than 200 parts by weight, preferably 50–150 parts by weight.

In the above-described manufacturing method, the sliding-surface forming member includes: the heat-resistant sheet member having on the overall surfaces thereof the heat-resistant coating having a uniform thickness of 0.05–0.3 g/100 cm$^2$ and formed of aluminum phosphate; the lubricating sliding layer coated on a surface of the heat-resistant coating on one surface of the another heat-resistant sheet member and formed of a lubricating composition which is constituted of 70–90 wt. % of boron nitride and 10–30 wt. % of at least one of alumina and silica, or a lubricating composition in which that lubricating composition is set as 100 parts by weight, and which further contains polytetrafluoroethylene resin in a proportion of not more than 200 parts by weight, preferably 50–150 parts by weight; and the reinforcing member made from the metal wire net disposed in such a manner as to coat the lubricating sliding layer.

In the above-described manufacturing method, the heat-resistant coating may be formed of a mixture of aluminum phosphate and at least one of graphite and the metal fluoride, and may be specifically formed of (1) a mixture in which a graphite powder and aluminum phosphate are mixed in a weight ratio of 1:0.3 to 4, (2) a mixture in which the metal fluoride and aluminum phosphate are mixed in a weight ratio of 1:0.3 to 4, or (3) a mixture in which a mixture of graphite and the metal fluoride, in which graphite is contained in a proportion of 50–80 wt. % and the metal fluoride is contained in a proportion of 20–50 wt. %, and aluminum phosphate are mixed in a weight ratio of 1:0.5–3. The heat-resistant coating is formed with a uniform thickness of 0.1–0.8 g/100 cm$^2$ on the overall surfaces of the heat-resistant sheet member.

In the above-described manufacturing method, the sliding-surface forming member may be formed of the heat-resistant sheet member having the heat-resistant coating which is constituted of (1) a mixture in which a graphite powder and aluminum phosphate are mixed in a weight ratio of 1:0.3 to 4, (2) a mixture in which the metal fluoride and aluminum phosphate are mixed in a weight ratio of 1:0.3 to 4, or (3) a mixture in which a mixture of graphite and the metal fluoride, in which graphite is contained in a proportion of 50–80 wt. % and the metal fluoride is contained in a proportion of 20–50 wt. %, and aluminum phosphate are mixed in a weight ratio of 1:0.5–3, and which is formed with a uniform thickness of 0.1–0.8 g/100 cm$^2$ on the overall surfaces of the heat-resistant sheet member; and the lubricating sliding layer coated on a surface of the heat-resistant coating on one surface of the heat-resistant sheet member and formed of a lubricating composition which is constituted of 70–90 wt. % of boron nitride and 10–30 wt. % of at least one of alumina and silica, or a lubricating composition in which that lubricating composition is set as 100 parts by weight, and which further contains polytetrafluoroethylene resin in a proportion of not more than 200 parts by weight, preferably 50–150 parts by weight; and the reinforcing member made from the metal wire net disposed in such a manner as to coat the lubricating sliding layer.

Hereafter, a more detailed description will be given of the constituent materials of the above-described spherical annular seal member and the method of manufacturing the spherical annular seal member.

The heat-resistant sheet member is constituted by a sheet member which is formed from heat-resistant material of at least one kind selected from expanded graphite, mica, and asbestos, and the heat-resistant coating is formed on overall surfaces of the heat-resistant sheet member. Among sheet materials for forming the heat-resistant sheet member, as a sheet material formed from expanded graphite, a sheet-like material having a thickness ranging from 0.3 to 1.0 mm, such as "Grafoil (trade name)" made by Union Carbide Corporation of the United States disclosed in Japanese Patent Application Publication No. 23966/1969 or "Nicafilm (trade name)" made by Nippon Carbon Co., Ltd., is suitably used. As a sheet material formed from mica, mica paper bonded by sicone resin is used, while as a sheet material formed from asbestos, an chrysotile- or amosite-based asbestos paper or asbestos sheet is used.

As a heat-resistant coating formed on the overall surfaces of the heat-resistant sheet member, aluminum primary phosphate ($Al_2O_3.3P_2O_5.6H_2O$) is used. This aluminum phosphate is used in the form of an aqueous solution, and the coating of the overall surfaces of the heat-resistant sheet member with the aqueous solution of aluminum phosphate is effected by brushing, roller coating, or the like. As the coated heat-resistant sheet member is subsequently allowed to dry, thereby forming a heat-resistant coating of aluminum phosphate on the overall surfaces of the heat-resistant sheet member.

Aluminum phosphate for forming the heat-resistant coating is heat resistant itself, and since its adhesiveness is high, at the outer surface formed in the shape of the partially convex spherical surface, aluminum phosphate exhibits the action of enhancing heat resistance and retention of the lubricating composition coated on the coating onto the outer surface formed in the shape of the partially convex spherical surface. Meanwhile, in the interior portion of the spherical annular seal member which extends from the cylindrical inner surface to a vicinity of the outer surface formed in the shape of the partially convex spherical surface, aluminum phosphate exhibits the action of enhancing the heat resistance of the seal member itself. Then, aluminum phosphate is formed as a coating with a uniform thickness of 0.05–0.3 g/100 cm$^2$ on the overall surfaces of the heat-resistant sheet member. If the amount of coating is less than 0.05 g/100 cm$^2$, it is impossible to expect a meritorious effect in terms of heat resistance, while if it is more than 0.3 g/100 cm$^2$, heat resistance can be enhanced, but a problem arises in the workability of the heat-resistant sheet member. For instance, in a working process in which the heat-resistant sheet member is wound into a cylindrical or spiral shape, at winding workability is hampered.

As a reinforcing material, a metal wire net is used which is formed by weaving or knitting, as an iron-based wire, a stainless steel wire made of such as austenitic stainless steels SUS 304 and SUS 316, a ferritic stainless steel SUS 430, or an iron wire (JIS-G-3532) or a galvanized iron wire (JIS-G-3547), or, as a copper wire, a wire member made of a copper-nickel alloy (cupro-nickel), a copper-nickel-zinc alloy (nickel silver), brass, or beryllium copper. As the wire diameter of the fine metal wire forming the metal wire net, a fine metal wire having a diameter of 0.10 to 0.32 mm or thereabouts is used, and a metal wire net whose meshes are 3 to 6 mm or thereabouts is suitably used.

As a lubricating composition, an aqueous dispersion containing as a solid content 20 to 50 wt. % of a lubricating composition containing 70 to 90 wt. % of boron nitride and 10 to 30 wt. % of at least one of alumina and silica is used. As an alternative lubricating composition, an aqueous dispersion may be used which contains as a solid content 20 to 50 wt. % of a lubricating composition in which a lubricating composition containing 70 to 90 wt. % of boron nitride and 10 to 30 wt. % of at least one of alumina and silica is set as 100 parts by weight, and which further contains polytetrafluoroethylene resin in the proportion of not more than 200 parts by weight, preferably 50 to 150 parts by weight. The above-described aqueous dispersion of the lubricating composition is coated on the surface of the heat-resistant coating constituted of aluminum phosphate or a mixture in which at least one of graphite and the metal fluoride is mixed with aluminum phosphate, which is formed on the surface of the heat-resistant sheet member, by means of brushing, roller coating, spraying, or the like in the manufacturing method which will be described later. In a final compression process, the coating is spread into a uniform and very small thickness (10 to 300 $\mu$m) on the outer surface formed in the shape of the partially convex spherical surface of the spherical annular seal member so as to form the lubricating sliding layer.

Boron nitride among the aforementioned lubricating compositions demonstrates excellent lubricity particularly at high temperatures. However, boron nitride as a single constituent is inferior in its adhesion onto the heat-resistant coating, and, hence, in its adhesion onto the outer surface formed in the shape of the partially convex spherical surface of the seal member in the final compression process. Consequently, boron nitride as a single constituent has a drawback in that it is easily exfoliated from the surface. However, by compounding at least one of alumina and silica with boron nitride at a fixed ratio, the aforementioned drawback of boron nitride can be avoided, its adhesion onto the heat-resistant coating and, hence, onto the outer surface formed in the shape of the partially convex spherical surface of the seal in the final compression process can be improved substantially, and the retention of the lubricating sliding layer, formed by the lubricating composition, on the outer surface formed in the shape of the partially convex spherical surface of the seal member can be enhanced. The proportion in which at least one of alumina and silica is compounded with respect to boron nitride is determined from the viewpoint of improving adhesion without impairing the lubricity of boron nitride, and a range of 10 to 30 wt. % is therefore preferable.

In the aforementioned lubricating composition in which the lubricating composition containing 70 to 90 wt. % of boron nitride and 10 to 30 wt. % of at least one of alumina and silica is set as 100 parts by weight, and which further contains polytetrafluoroethylene resin at a fixed ratio, polytetrafluoroethylene resin itself has a low frictional property, and as it is compounded with the lubricating composition formed of boron nitride and at least one of alumina and silica, polytetrafluoroethylene resin exhibits the action of improving the low frictional property of the lubricating composition and the action of enhancing the ductility of the lubricating composition during compression forming. The proportion in which polytetrafluoroethylene resin is compounded with respect to 100 parts by weight of the lubricating composition containing 70 to 90 wt. % of boron nitride and 10 to 30 wt. % of at least one of alumina and silica is not more than 200 parts by weight, preferably in the range of 50 to 150 parts by weight. If the compounding proportion of polytetrafluoroethylene resin exceeds 200 parts by weight, the proportion of the resin in the lubricating composition becomes large, thereby resulting in a decline in the heat resistance of the lubricating composition. If the compounding proportion of polytetrafluoroethylene resin is in the range of 50 to 150 parts by weight, the low frictional property can be demonstrated most satisfactorily without impairing the heat resistance of the lubricating composition.

Boron nitride, at least one of alumina and silica for forming the aqueous dispersion as well as polytetrafluoroethylene resin which may be compounded therewith are preferably in the form of as fine powders as possible, and fine powders having average particle sizes of 10 $\mu$m or less, preferably 0.5 $\mu$m or less, are used.

The sliding-surface forming member includes: a heat-resistant sheet member similar to the aforementioned heat-resistant sheet member having on the overall surfaces thereof the heat-resistant coating formed of aluminum phosphate, i.e., a heat-resistant sheet member having on overall surfaces thereof a heat-resistant coating formed of aluminum phosphate; a sliding layer coated on a surface of the heat-resistant coating on one surface of the another heat-resistant sheet member and formed of a lubricating composition constituted of one of boron nitride and a mixture of boron nitride and polytetrafluoroethylene resin and at least one of alumina and silica; and a reinforcing member made from a metal wire net disposed in such a manner as to coat the sliding layer. As for the heat-resistant coating, the sliding layer formed of a lubricating composition, and the reinforcing member formed of a metal wire net in this sliding-surface forming member, those similar to the aforementioned ones are used, so that a description thereof will be omitted.

As the heat-resistant coating formed on the overall surfaces of the heat-resistant sheet member, it is possible to use any one of (1) a mixture of graphite and aluminum phosphate, (2) a mixture of a metal fluoride and aluminum phosphate, and (3) a mixture between a mixture of graphite and a metal fluoride aluminum phosphate.

A specific description will be given of this heat-resistant coating.
(1) Heat-resistant Coating Formed of a Mixture of Graphite and Aluminum Phosphate This heat-resistant coating is one in which graphite and aluminum phosphate are compounded in a weight ratio of 1:0.3–4. To show an example of manufacture, a mixture in which 15 g of graphite powder is mixed in 30 g of an aqueous solution of aluminum primary phosphate ($Al_2O_3 \cdot 3P_2O_5 \cdot 6H_2O$) of a 25% concentration is coated on the overall surfaces of the heat-resistant sheet member by means of brushing, roller coating, immersion, or the like. The coated heat-resistant sheet member is then allowed to dry. As a result, a heat-resistant coating whose weight ratio between graphite and aluminum phosphate is 1:0.5 is formed on the overall surfaces of the heat-resistant sheet member.

(2) Heat-resistant Coating Formed of a Mixture of Metal Fluoride and Aluminum Phosphate This heat-resistant coating is one formed of a mixture in which a metal fluoride and aluminum phosphate are compounded in a weight ratio of 1:0.3–4. To show an example of manufacture, a mixture in which 15 g of the metal fluoride powder is mixed in 30 g of an aqueous solution of aluminum primary phosphate of a 25% concentration is coated on the overall surfaces of the heat-resistant sheet member by means of brushing, roller coating, immersion, or the like. The coated heat-resistant sheet member is then allowed to dry. Consequently, a heat-resistant coating formed of a mixture of the metal fluoride and aluminum phosphate whose weight ratio is 1:0.5 is formed on the overall surfaces of the heat-resistant sheet member.

(3) Heat-resistant Coating Formed of a Mixture of Graphite and Metal Fluoride on the One Hand, and Aluminum Phosphate, on the Other This heat-resistant coating is formed of a mixture in which a mixture of graphite and a metal fluoride, which are compounded in a ratio of 50–80 wt. % for graphite and 20–50 wt. % for the metal fluoride, and aluminum phosphate are compounded in a weight ratio of 1:0.5–3. To show an example of manufacture, a mixture, in which 7.5 g of graphite powder ad 7.5 g of the metal fluoride powder are mixed in 30 g of an aqueous solution of aluminum primary phosphate of a 25% concentration, is coated on the overall surfaces of the heat-resistant sheet member by means of brushing, roller coating, immersion, or the like. The coated heat-resistant sheet member is then allowed to dry. Consequently, a heat-resistant coating formed of a mixture of the metal fluoride and aluminum phosphate whose weight ratio is 1:0.5 is formed on the overall surfaces of the heat-resistant sheet member.

These heat-resistant coatings of the variations (1) to (3) above are formed on the overall surfaces of the heat-resistant sheet member with a uniform thickness of 0.1–0.8 g/100 $cm^2$.

In the heat-resistant coating thus formed, aluminum phosphate itself is heat resistant, and since its adhesiveness is high, aluminum phosphate exhibits the action of enhancing heat adhesiveness of the particles of the heat-resistant graphite powder, the particles of the metal fluoride powder, and the particles of the mixed powders of graphite and the metal fluoride, and the adhesiveness of the heat-resistant coating formed of such a material onto the surface of the heat-resistant sheet member, i.e., the retention of the heat-resistant coating onto the surface of the heat-resistant sheet member.

In addition, at least one of graphite and the metal fluoride in the mixture is heat resistant itself, and has self-lubricity. The metal fluoride exhibits excellent lubricity particularly at high temperatures, and demonstrates the effect of reducing the frictional resistance with a mating member (the concave spherical portion of the downstream-side exhaust pipe) due to its self-lubricity on the outer side formed in the shape of the partially convex spherical surface even in cases where the sliding layer constituted by a lubricating composition coating the heat-resistant coating has disappeared due to wear. Then, as the metal fluoride, at least one kind is selected from calcium fluoride ($CaF_2$), lithium fluoride ($LiF_2$), sodium fluoride ($NaF_2$), and barium fluoride ($BaF_2$).

The sliding-surface forming member may include: a heat-resistant sheet member similar to the aforementioned heat-resistant sheet member having the heat-resistant coating on the overall surfaces thereof, i.e., a heat-resistant sheet member having on overall surfaces thereof a heat-resistant coating formed of a mixture of graphite and aluminum phosphate, a mixture of the metal fluoride and aluminum phosphate, or a mixture of graphite, the metal fluoride, and aluminum phosphate; a sliding layer coated on a surface of the heat-resistant coating on one surface of the another heat-resistant sheet member and formed of a lubricating composition constituted of one of boron nitride and a mixture of boron nitride and polytetrafluoroethylene resin and at least one of alumina and silica; and a reinforcing member made from a metal wire net disposed in such a manner as to coat the sliding layer. As for the heat-resistant coating, the sliding layer formed of a lubricating composition, and the reinforcing member formed of a metal wire net in this sliding-surface forming member, those similar to the aforementioned ones are used, so that a description thereof will be omitted.

With the spherical annular seal member in accordance with the present invention, in its interior portion which extends from the cylindrical inner surface to the outer surface formed in the shape of the partially convex spherical surface, the heat-resistant sheet member having the heat-resistant coating on the overall surfaces thereof and the reinforcing member formed from the metal wire net are intertwined with each other and is provided with structural integrality, and the heat resistance of the seal member itself is enhanced. Therefore, even at a high-temperature condition of 650° C., the spherical annular seal member is capable of sufficiently demonstrating its function as a seal member. In addition, in the manufacturing method, the process of forming the heat-resistant coating on the overall surfaces of expanded graphite or the like is merely added, and there occurs no need for substantially altering the manufacturing process in the conventional manufacturing method.

Next, with reference to the accompanying drawings, a description will be given of the method of manufacturing the spherical annular seal member formed of the above-described constituent materials.

DESCRIPTION OF THE PREFERRED EMBODIMENTS

Figure 3:
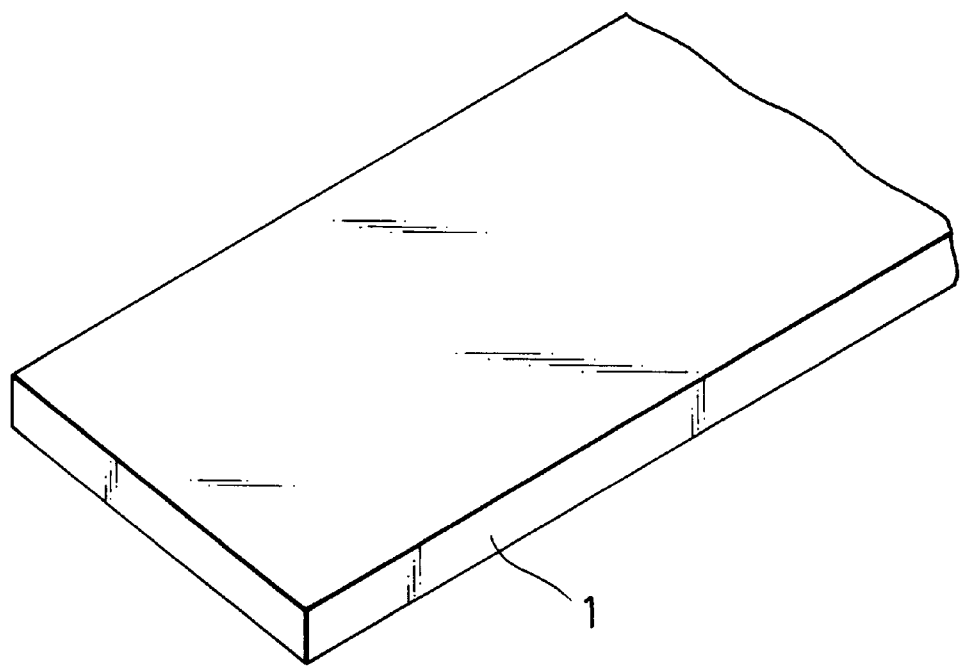
FIG. 3 is a perspective view of a heat-resistant sheet member in a process of manufacturing the spherical annular seal member in accordance with the present invention.
Figure 4:
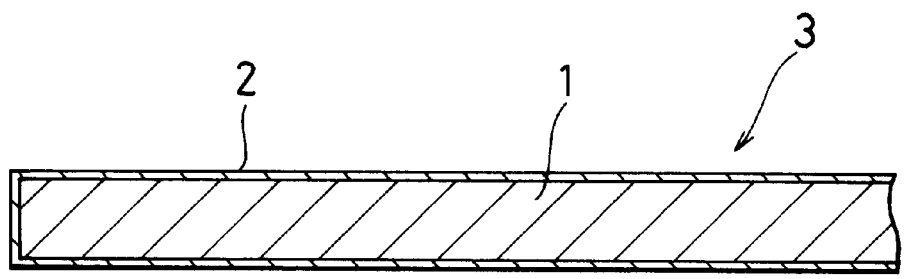
FIG. 4 is a cross-sectional view of the heat-resistant sheet member coated with a heat-resistant coating in the process of manufacturing the spherical annular seal member in accordance with the present invention.

As shown in FIG. 3, a heat-resistant sheet member 1 which is formed of an expanded graphite sheet, a mica sheet, or an asbestos sheet of an elongated shape cut to a predetermined width is prepared. Subsequently, an aqueous solution of aluminum primary phosphate of a predetermined concentration is prepared, and the overall surfaces of the sheet member 1 are coated with this aqueous solution by such means as brushing, roller coating, or immersion, are then allowed to dry, thereby forming a heat-resistant coating 2 having a uniform thickness of 0.05 to 0.3 g/100 cm$^2$ on the overall surfaces (the entire surfaces including obverse, reverse, and lateral surfaces) of the sheet member 1, as shown in FIG. 4. Hereafter, the heat-resistant sheet member 1 having the heat-resistant coating 2 will be referred to as a heat-resistant sheet member 3.

Alternatively, the heat-resistant coating 2 may be formed as follows: A heat-resistant sheet member 1 similar to the one described above is prepared, and (1) a mixture in which a graphite powder is compounded in an aqueous solution of aluminum primary phosphate of a predetermined concentration, (2) a mixture in which a metal fluoride powder is compounded in an aqueous solution of aluminum primary phosphate of a predetermined concentration, or (3) a mixture in which 50 to 80 wt. % of a graphite powder and 20 to 50 wt. % of a metal fluoride powder are compounded in an aqueous solution of aluminum primary phosphate of a predetermined concentration, is prepared. Subsequently, the overall surfaces of the sheet member 1 are coated with this mixture by such means as brushing, roller coating, or immersion, and are then allowed to dry, thereby forming the heat-resistant coating 2 having a uniform thickness of 0.1 to 0.8 g/100 cm$^2$ on the overall surfaces (the entire surfaces including obverse, reverse, and lateral surfaces) of the sheet member 1, as shown in FIG. 4. Hereafter, the heat-resistant sheet member 1 having the heat-resistant coating 2 will also be referred to as the heat-resistant sheet member 3 in the same way as described above.

The heat-resistant coating 2 coated on the overall surfaces of the heat-resistant sheet member 1 in this case is prepared by appropriately adjusting the proportion in which at least one of graphite and the metal fluoride is compounded in the aqueous solution of aluminum primary phosphate as well as the concentration of the aqueous solution of aluminum primary phosphate, such that the heat-resistant coating 2 is formed by (1) a mixture whose weight ratio between graphite and aluminum phosphate is 1:0.3 to 4, (2) a mixture whose weight ratio between the metal fluoride and aluminum phosphate is 1:0.3 to 4, or (3) a mixture whose weight ratio between, on the one hand, graphite and the metal fluoride and, on the other hand, aluminum phosphate is 1:0.5 to 3.

In the above-described method of forming the heat-resistant coating 2, it is possible to use aluminum primary phosphate whose concentration is 10 to 50%. However, if the operation of coating the sheet member 1, a subsequent drying process, and the like are taken into consideration, it is preferable to use aluminum primary phosphate whose concentration is 25% or thereabouts.

Figure 5:
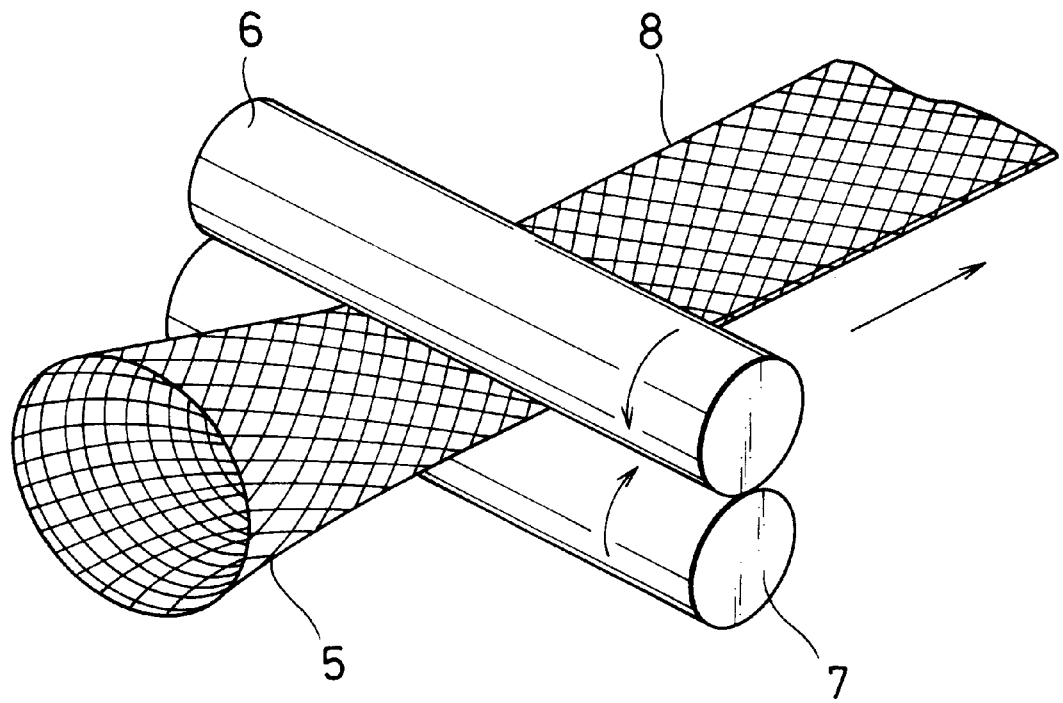
FIG. 5 is a diagram explaining the formation of a reinforcing member constituted by a metal wire net in the process of manufacturing the spherical annular seal member in accordance with the present invention.

A metal wire net, which is formed by weaving or knitting fine metal wires, is prepared, and this metal wire net is cut into a predetermined width (substantially the same width as that of the heat-resistant sheet member 1) so as to form an elongated metal wire net. Alternatively, as shown in FIG. 5, after a cylindrical metal wire net 5 is formed by knitting fine metal wires, the cylindrical metal wire net 5 is passed between a pair of rollers 6 and 7 so as to fabricate a belt-shaped metal wire net 8, which is then cut into an elongated metal wire net. Such an elongated metal wire net is used as a reinforcing member 9.

Figure 6:
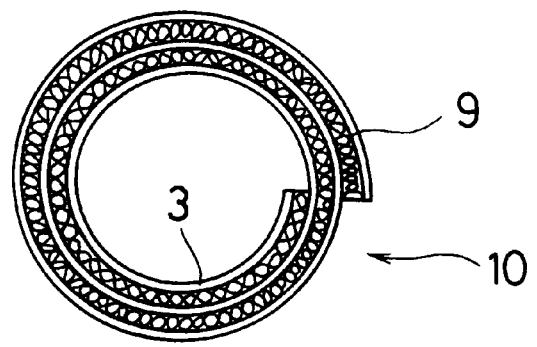
FIG. 6 is a plan view of a tubular base member in the process of manufacturing the spherical annular seal member in accordance with the present invention.

The reinforcing member 9, which is thus formed by the elongated metal wire net or the belt-shape metal wire net 8, and one of the aforementioned heat-resistant sheet members 3 are superposed one on top of the other, and a superposed assembly thereof is convoluted into a cylindrical shape with the heat-resistant sheet member 3 placed on the inner side with respect to the reinforcing member 9, such that the heat-resistant sheet member 3 is exposed on the inner periphery and also on the outermost periphery, thereby preparing a tubular base member 10, as shown in FIG. 6.

Figure 7:
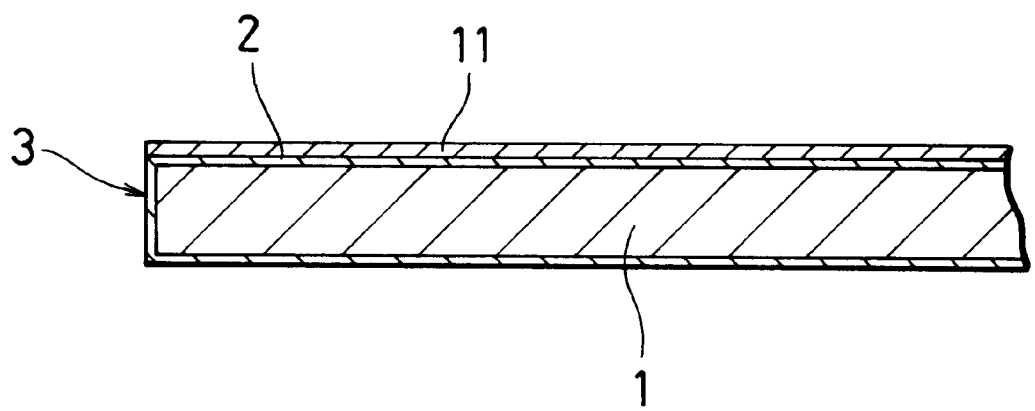
FIG. 7 is a cross-sectional view of the heat-resistant sheet member coated with a lubricating sliding layer formed thereon in the process of manufacturing the spherical annular seal member in accordance with the present invention.

One of the heat-resistant sheet members 3 similar to those described above is prepared separately. Subsequently, an aqueous dispersion containing as a solid content 20 to 50 wt. % of a lubricating composition constituted of 70 to 90 wt. % of boron nitride and 10 to 30 wt. % of at least one of alumina and silica, or an aqueous dispersion containing as a solid content 20 to 50 wt. % of a lubricating composition in which a lubricating composition constituted of 70 to 90 wt. % of boron nitride and 10 to 30 wt. % of at least one of alumina and silica is set as 100 parts by weight, and which further contains polytetrafluoroethylene resin in the proportion of not more than 200 parts by weight, preferably 50–150 parts by weight, is applied to one surface of the heat-resistant sheet member 3 by means of brushing, roller coating, spraying, or the like, and is then dried to form a lubricating sliding layer 11 which is formed of the lubricating composition, as shown in FIG. 7.

Figure 8:
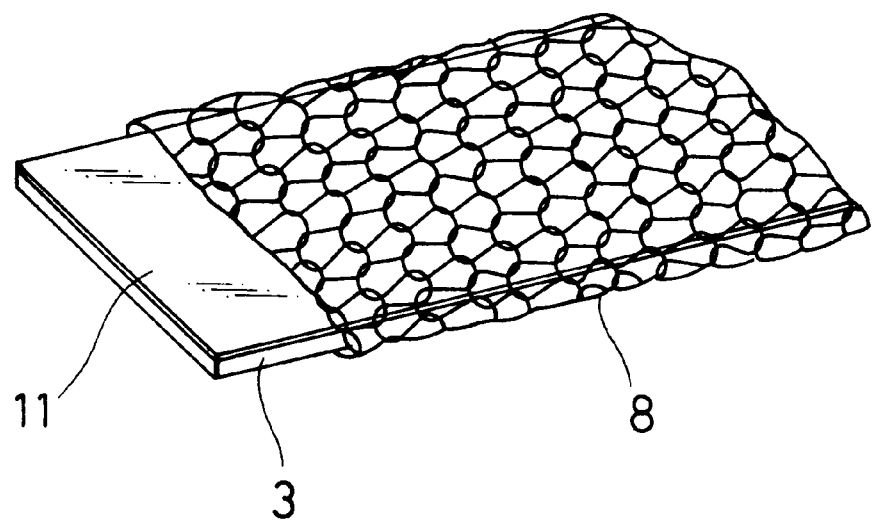
FIG. 8 is a diagram explaining a method of forming a sliding-surface forming member in the process of manufacturing the spherical annular seal member in accordance with the present invention.
Figure 9:
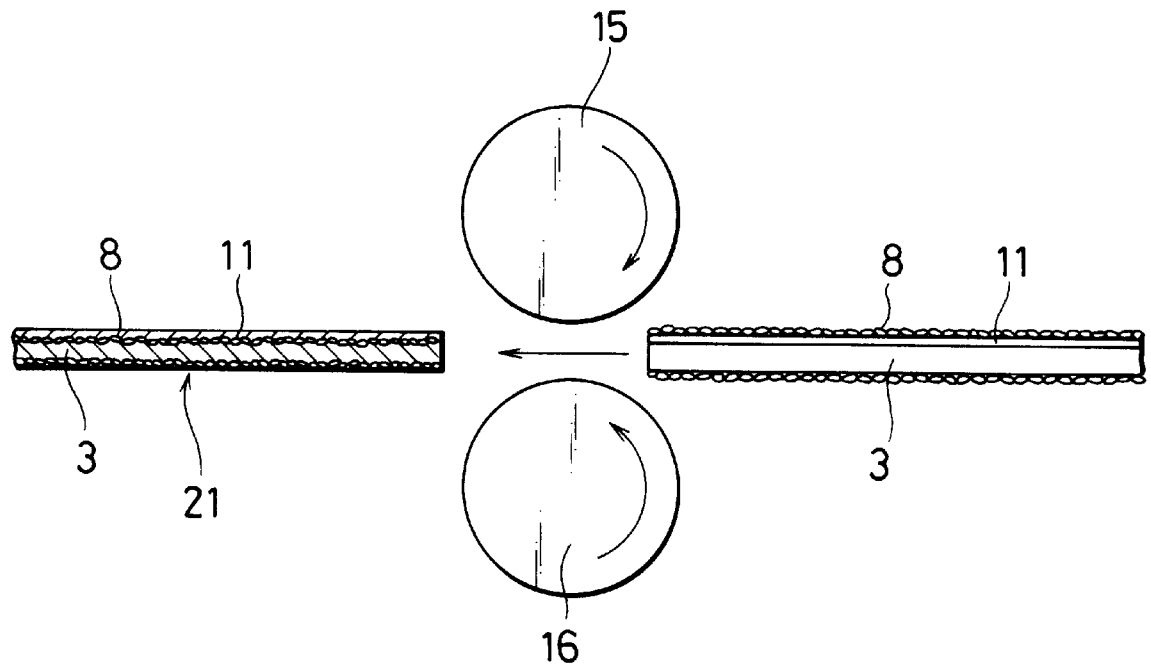
FIG. 9 is a diagram explaining a method of forming a sliding-surface forming member in the process of manufacturing the spherical annular seal member in accordance with the present invention.

Meanwhile, as described earlier with reference to FIG. 5, after the fine metal wires are woven to form the cylindrical metal wire net 5, the reinforcing member 9 constituted by the belt-shaped metal wire net 8, which is fabricated by allowing the cylindrical metal wire net 5 to be passed between the pair of rollers 6 and 7, is prepared separately. Subsequently, as shown in FIG. 8, the heat-resistant sheet member 3 having the lubricating sliding layer 11 is inserted into the belt-shaped metal wire net 8, and, as shown in FIG. 9, an assembly thereof is passed between a pair of rollers 15 and 16 so as to be formed integrally, thereby preparing a sliding-surface forming member 21.

Figure 10:
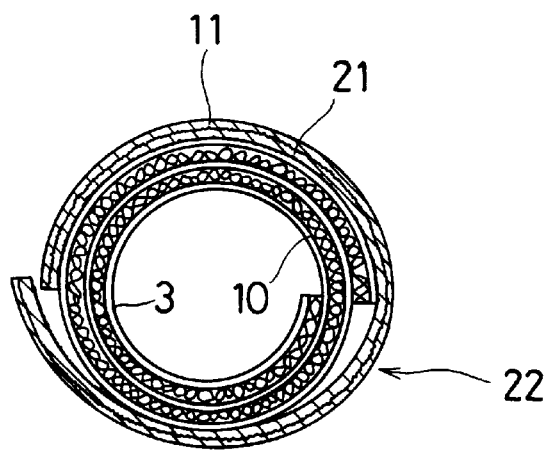
FIG. 10 is a plan view of a cylindrical preform in the process of manufacturing the spherical annular seal member in accordance with the present invention.

The sliding-surface forming member 21 thus obtained is wound around an outer peripheral surface of the aforementioned tubular base member 10 with the lubricating sliding layer 11 placed on the outer side, thereby preparing a cylindrical preform 22, as shown in FIG. 10.

Figure 11:
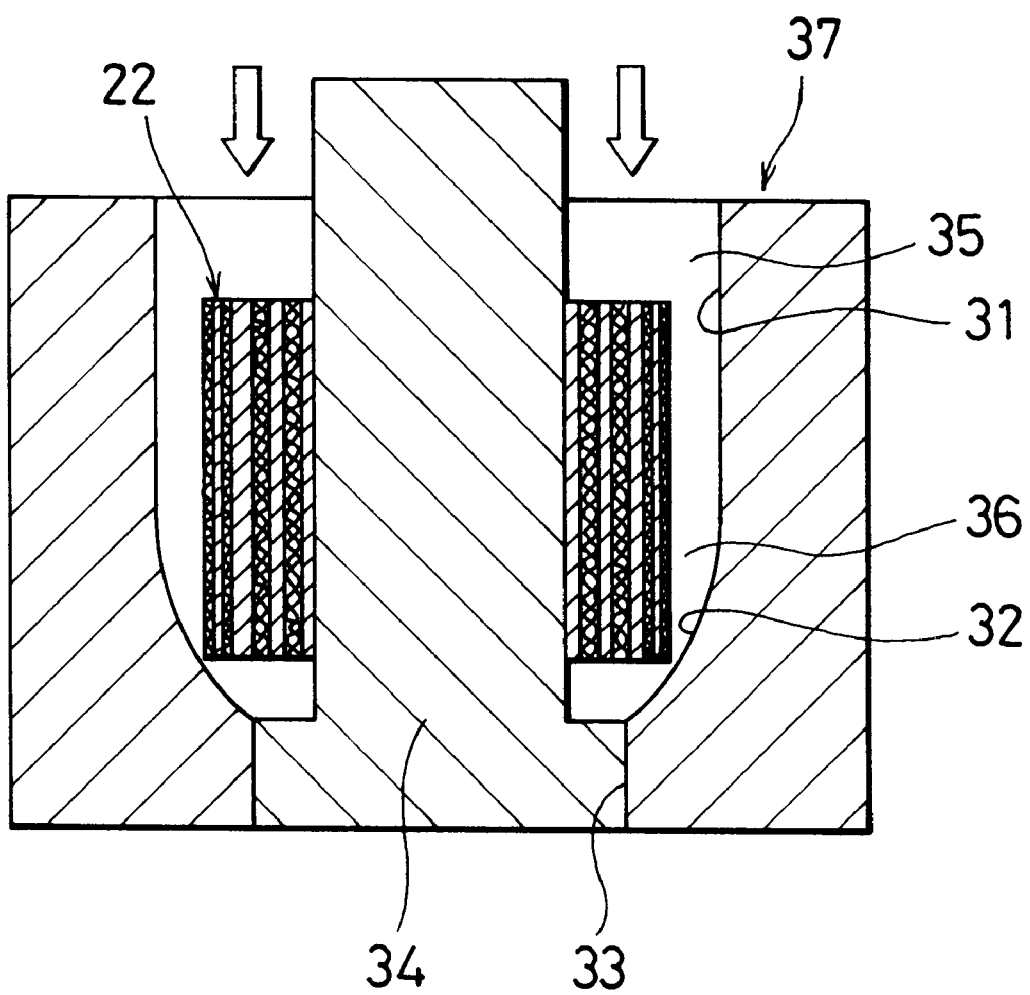
FIG. 11 is a vertical cross-sectional view illustrating a state in which the cylindrical preform is inserted in a die in the process of manufacturing the spherical annular seal member in accordance with the present invention.

As shown in FIG. 11, a die 37 is prepared which has a cylindrical inner wall surface 31, a partially concave spherical inner wall surface 32 continuing from the cylindrical inner wall surface 31, and a through hole 33 continuing from the partially concave spherical inner wall surface 32, and in which a hollow cylindrical portion 35 and a spherical annular hollow portion 36 continuing from the hollow cylindrical portion 35 are formed inside it as a stepped core 34 is inserted in the through hole 33. Then, the cylindrical preform 22 is fitted over the stepped core 34 of the die 37.

Figure 1:
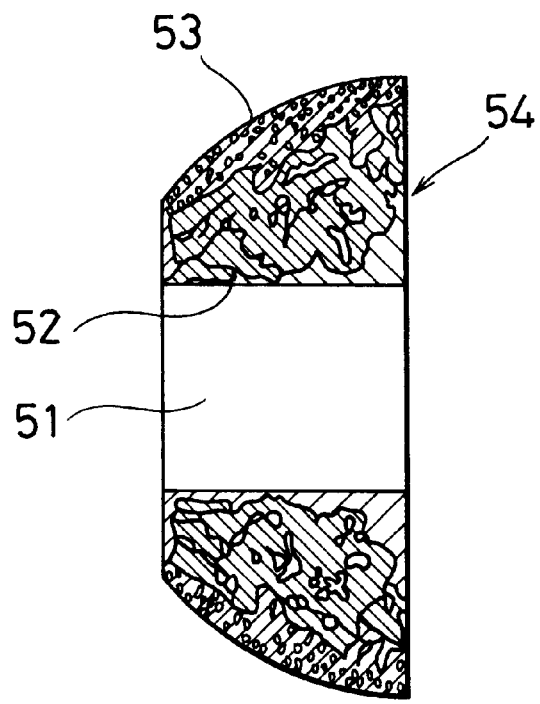
FIG. 1 is a vertical cross sectional view illustrating a spherical annular seal member in accordance with the present invention.

The cylindrical preform 22 located in the hollow portion of the die 37 is subjected to compression forming under a pressure of 1 to 3 tons/cm$^2$ in the direction of the core axis. Thus, a spherical annular seal member 54 having a cylindrical inner surface 52 defining a through hole 51 in its center as well as an outer surface 53 formed in the shape of a partially convex spherical surface is fabricated, as shown in FIG. 1. By means of this compression forming, in the inner portion of the spherical annular seal member 54 from the cylindrical inner surface 52 to the vicinity of the outer surface 53 formed in the shape of the partially convex spherical surface, the reinforcing member 9, which is constituted by the metal wire net 8, and the heat-resistant sheet member 3, which has the heat-resistant coating 2 formed of aluminum phosphate on its overall surface, are compressed and are intertwined with each other, and are thus arranged to be provided with structural integrality. The outer surface 53 formed in the shape of the partially convex spherical surface is constituted by an exposed surface of the lubricating sliding layer 11 formed of the lubricating composition, and the reinforcing member 9 constituted by the metal wire net 8, which is formed integrally with the sliding layer 11, is disposed in the lubricating layer 11. The outer surface 53 formed in the shape of the partially convex spherical surface, where the sliding layer 11 and the reinforcing member 9 constituted by the metal wire net 8 formed integrally with the sliding layer 11 in mixed form are exposed, is formed into a smooth surface, while the cylindrical inner surface 52 at the through hole 51 is formed with the heat-resistant coating 2 exposed.

Figure 2:
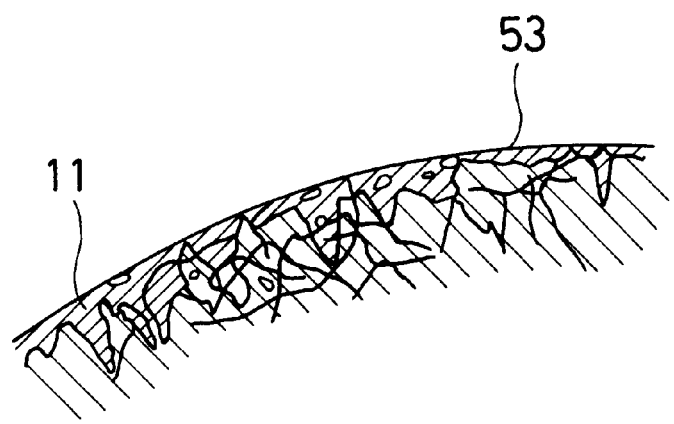
FIG. 2 is a partially enlarged cross-sectional view of an outer surface of a partially convex spherical surface of the spherical annular seal member in accordance with the present invention.

In the spherical annular seal member 54 fabricated by the above-described method and shown in FIGS. 1 and 2, the heat-resistant sheet member 3 is intertwined and formed integrally with the reinforcing member 9 constituted by the metal wire net 8 which forms an internal structure, while the outer surface 53 formed in the shape of the partially convex spherical surface is formed into a smooth surface in which the metal wire net 8 and the exposed surface of the lubricating sliding layer formed of the sliding-surface forming member 21 are integrated in mixed form.

Figure 12:
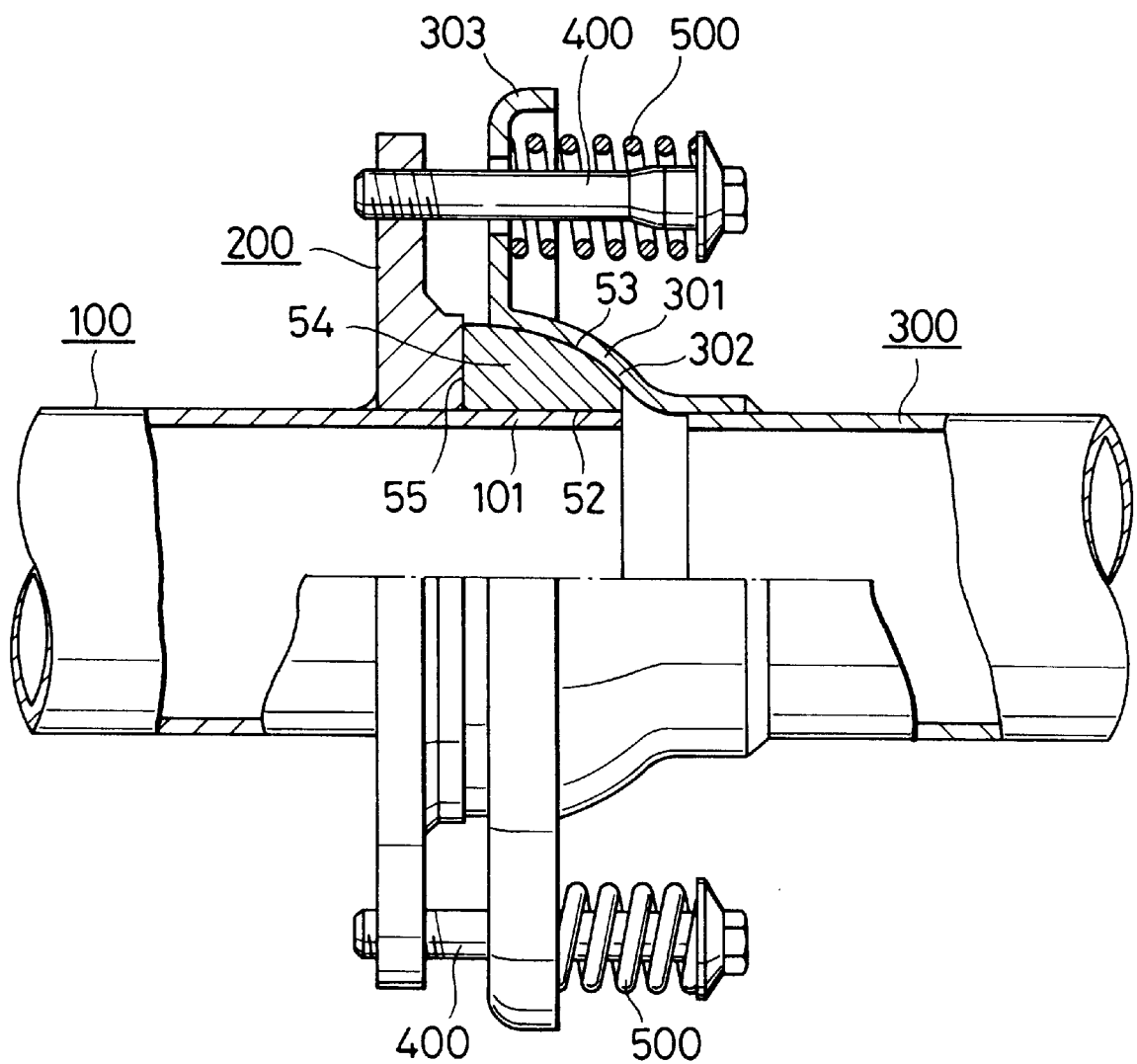
FIG. 12 is a vertical cross-sectional view of an exhaust pipe joint in which the spherical annular seal member in accordance with the present invention has been incorporated.

The spherical annular seal member 54 is used by being incorporated in the exhaust pipe joint shown in FIG. 12, for example. That is, a flange 200 is provided uprightly on an outer peripheral surface of an upstream-side exhaust pipe 100, which is connected to an engine, by leaving a pipe end 101. The spherical annular seal member 54 is fitted over the pipe end 101 at the cylindrical inner surface 52 defining the through hole 15, and is seated with its large-diameter-side end face 55 abutting against that flange 200. A downstream-side exhaust pipe 300 opposes at one end the upstream-side exhaust pipe 100 and is connected at the other end to a muffler. A flared portion 301, which is comprised of a concave spherical surface portion 302 and a flange portion 303 provided at a rim of an opening portion of the concave spherical surface portion 302, is formed integrally at one end of the downstream-side exhaust pipe 300. The exhaust pipe 300 is disposed with the concave spherical surface portion 302 slidingly abutting against the outer surface 53 formed in the shape of the partially convex spherical surface of the spherical annular seal member 54.

The downstream-side exhaust pipe 300 is constantly urged toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between a head of the bolt 400 and the flange portion 303. The arrangement provided is such that relative angular displacements occurring in the upstream- and downstream-side exhaust pipes 100 and 300 are allowed by sliding contact between the outer surface 53 formed in the shape of the partially convex spherical surface of the spherical annular seal member 54 and the concave spherical surface portion 302 of the flared portion 301 formed at the end of the downstream-side exhaust pipe 300.

Next, a detailed description will be given of examples of the spherical annular seal member in accordance with the present invention.

EXAMPLE 1

As a heat-resistant sheet member, an expanded graphite sheet ("Nicafilm (trade name)" made by Nippon Carbon Co., Ltd., the weight of the expanded graphite sheet being 17.0 g) having a width of 55 mm, a length of 550 mm, and a thickness of 0.38 mm was prepared. An aqueous solution of aluminum primary phosphate of a 25% concentration was prepared, the overall surfaces of the aforementioned expanded graphite sheet were coated with this aqueous solution by roller coating, and the thus-coated expanded graphite sheet was then allowed to dry for 20 minutes at a temperature of 150° C. in a drying furnace so as to form a heat-resistant coating with a uniform thickness of 0.07 g/100 cm$^2$ on the overall surfaces of the expanded graphite sheet. The sheet thus obtained was used as the heat-resistant sheet member.

By using an austenitic stainless steel wire (SUS 304) having a wire diameter of 0.28 mm as the fine metal wire, a cylindrical woven metal wire net whose meshes were 4.0 mm was fabricated and was passed between a pair of rollers to form a belt-shaped metal wire net (with a width of 36 mm and a length of 360 mm). The metal wire net thus formed was used as the reinforcing member. After this reinforcing member and the aforementioned heat-resistant sheet member having the heat-resistant coating were superposed one on top of the other, a superposed assembly thereof was convoluted with the heat-resistant sheet member placed on the inner side with respect to the reinforcing member, such that the heat-resistant sheet member was exposed on the inner periphery and also on the outermost periphery, thereby preparing the tubular base member.

As another heat-resistant sheet member, an expanded graphite sheet having a width of 48 mm, a length of 212 mm, and a thickness of 0.38 mm (the weight of the expanded graphite sheet being 4.2 g) was prepared separately. By using the same method as described before, the heat-resistant sheet member in which the heat-resistant coating with a uniform thickness of 0.07 g/100 cm$^2$ was formed on the overall surfaces of the expanded graphite sheet was fabricated. Subsequently, an aqueous dispersion (25.5 wt. % of boron nitride, 4.5 wt. % of alumina, and 70 wt. % of water) containing as a solid content 30 wt. % of a lubricating composition constituted of 85 wt. % of boron nitride powder with an average particle size of 7 μm and 15 wt. % of alumina powder with an average particle size of 0.6 μm, was applied to the surface of the heat-resistant coating on one surface of the heat-resistant sheet member by means of roller coating, and was then dried. This coating operation was repeated three times to form the lubricating sliding layer constituted by the lubricating composition. In addition, by using fine metal wires similar to those described above, a cylindrical woven metal wire net whose meshes were 4.0 mm was formed, and was passed between the pair of rollers, thereby fabricating the belt-shaped metal wire net (with a width of 53.5 mm and a length of 212 mm). The heat-resistant sheet member having the lubricating sliding layer was inserted into the belt-shaped metal wire net, and an assembly thereof was passed between the pair of rollers so as to be formed integrally, thereby fabricating the sliding-surface forming member on one surface of which the reinforcing member and the lubricating composition filling the meshes of the reinforcing member were present in mixed form.

This sliding-surface forming member was wound around an outer peripheral surface of the aforementioned tubular base member in a state in which the surface of the lubricating sliding layer was placed on the outer side, thereby preparing the cylindrical preform. This cylindrical preform was fitted over the stepped core 34 of the die 37 shown in FIG. 11, and was placed in the hollow portion of the die 37.

The cylindrical preform located in the hollow portion of the die 37 was subjected to compression forming under a pressure of 3 tons/cm$^2$ in the direction of the core axis. Thus, the spherical annular seal member 54, which had the cylindrical inner surface 52 defining the through hole 51 in its center and whose outer surface 53 was formed in the shape of the partially convex spherical surface, was obtained. The weight ratio between the heat-resistant material constituted of the expanded graphite sheet and aluminum phosphate for forming the heat-resistant coating in this spherical annular seal member was 100 to 2.7 in terms of ratio the heat-resistant material to aluminum phosphate.

EXAMPLE 2

As a heat-resistant sheet member, an expanded graphite sheet similar to the one used in Example 1 (the weight of the expanded graphite sheet being 17.0 g) was prepared. An aqueous solution of aluminum primary phosphate of a 25% concentration was prepared, the operation of coating the overall surfaces of the aforementioned expanded graphite sheet with this aqueous solution by roller coating was repeated twice, and the thus-coated expanded graphite sheet was then allowed to dry for 20 minutes at a temperature of 150° C. in the drying furnace so as to form the heat-resistant coating with a uniform thickness of 0.15 g/100 cm$^2$ on the overall surfaces of the expanded graphite sheet. The sheet thus obtained was used as the heat-resistant sheet member. Subsequently, the tubular base member was fabricated in the same way as in the above-described Example 1.

As another heat-resistant sheet member, an expanded graphite sheet having a width of 48 mm, a length of 212 mm, and a thickness of 0.38 mm (the weight of the expanded graphite sheet being 4.2 g) was prepared separately. By using the same method as described above, the heat-resistant sheet member in which the heat-resistant coating with a uniform thickness of 0.15 g/100 cm$^2$ was formed on the overall surfaces of the expanded graphite sheet was fabricated separately. By using a lubricating composition similar to the one used in the above-described Example 1, the lubricating sliding layer constituted by the lubricating composition was formed on the surface of the heat-resistant coating on one surface of the heat-resistant sheet member, and the sliding-surface forming member was then fabricated in the same method as the one used in the above-described Example 1. Subsequently, the spherical annular seal member 54 was fabricated in the same method as the one used in the above-described Example 1. The weight ratio between the heat-resistant material constituted of the expanded graphite sheet and aluminum phosphate for forming the heat-resistant coating in this spherical annular seal member was 100 to 5.8 in terms of the ratio of the heat-resistant material to aluminum phosphate.

EXAMPLE 3

As a heat-resistant sheet member, an expanded graphite sheet similar to the one used in Example 1 (the weight of the expanded graphite sheet being 17.0 g) was prepared. An aqueous solution of aluminum primary phosphate of a 25% concentration was prepared, the operation of coating the overall surfaces of the aforementioned expanded graphite sheet with this aqueous solution by roller coating was repeated three times, and the thus-coated expanded graphite sheet was then allowed to dry for 20 minutes at a temperature of 150° C. in the drying furnace so as to form the heat-resistant coating with a uniform thickness of 0.3 g/100 $cm^2$ on the overall surfaces of the expanded graphite sheet. The sheet thus obtained was used as the heat-resistant sheet member.

As another heat-resistant sheet member, an expanded graphite sheet having a width of 48 mm, a length of 212 mm, and a thickness of 0.38 mm (the weight of the expanded graphite sheet being 4.2 g) was prepared separately. By using the same method as described above, the heat-resistant sheet member in which the heat-resistant coating with a uniform thickness of 0.3 g/100 $cm^2$ was formed on the overall surfaces of the expanded graphite sheet was fabricated separately. Subsequently, by using a lubricating composition similar to the one used in the above-described Example 1, the lubricating sliding layer constituted by the lubricating composition was formed on the surface of the heat-resistant coating on one surface of the heat-resistant sheet member, and the sliding-surface forming member was then fabricated in the same method as the one used in the above-described Example 1. Subsequently, the spherical annular seal member 54 was fabricated in the same method as the one used in the above-described Example 1. The weight ratio between the heat-resistant material composition constituted of the expanded graphite sheet and aluminum phosphate for forming the heat-resistant coating in this spherical annular seal member was 100 to 11.5 in terms of the ratio of the heat-resistant material to aluminum phosphate.

EXAMPLE 4

The tubular base member was fabricated by using a heat-resistant sheet member similar to the one used in the above-described Example 1 (a heat-resistant sheet member provided with the heat-resistant coating having a uniform thickness of 0.07 g/100 $cm^2$ on the overall surfaces of the expanded graphite sheet). As another heat-resistant sheet member, in the same way as in the above-described Example 1, an expanded graphite sheet having a width of 48 mm, a length of 212 mm, and a thickness of 0.38 mm (the weight of the expanded graphite sheet being 4.2 g) was prepared separately, and the heat-resistant sheet member in which the heat-resistant coating with a uniform thickness of 0.07 g/100 $cm^2$ was provided on the overall surfaces of the expanded graphite sheet was fabricated separately. Subsequently, an aqueous dispersion (25.5 wt. % of boron nitride, 4.5 wt. % of alumina, and 70 wt. % of water) containing as a solid content 30 wt. % of a lubricating composition (56.7 wt. % of boron nitride, 10 wt. % of alumina, and 33.3 wt. % of polytetrafluoroethylene resin), in which a lubricating composition constituted of 85 wt. % of boron nitride powder with an average particle size of 7 μm and 15 wt. % of alumina powder with an average particle size of 0.6 μm was set as 100 parts by weight, and which further contained 50 parts by weight of polytetrafluoroethylene resin powder with an average particle size of 0.3 μm, was applied to the surface of the heat-resistant coating on one surface of the heat-resistant sheet member by means of roller coating, and was then dried. This coating operation was repeated three times to form the lubricating sliding layer constituted by the lubricating composition. Then, a belt-shaped metal wire net, which was obtained by forming a cylindrical woven metal wire net similar to the aforementioned reinforcing member and by subsequently allowing this cylindrical woven metal wire net to be passed between the pair of rollers, was prepared separately. The heat-resistant sheet member having the lubricating sliding layer was inserted into the belt-shaped metal wire net, and an assembly thereof was passed between the pair of rollers so as to be formed integrally, thereby fabricating the sliding-surface forming member on one surface of which the reinforcing member and the lubricating composition filling the meshes of the reinforcing member were present in mixed form. Subsequently, the spherical annular seal member 54 was fabricated in the same method as the one used in Example 1. The weight ratio between the heat-resistant material composition constituted of the expanded graphite sheet and aluminum phosphate for forming the heat-resistant coating in this spherical annular seal member was 100 to 2.7 in terms of the ratio of the heat-resistant material to aluminum phosphate in the same way as in the above-described Example 1.

EXAMPLE 5

The tubular base member was fabricated by using a heat-resistant sheet member similar to the one used in the above-described Example 2 (a heat-resistant sheet member provided with the heat-resistant coating having a uniform thickness of 0.15 g/100 $cm^2$ on the overall surfaces of the expanded graphite sheet). As another heat-resistant sheet member, in the same way as in the above-described Example 2, an expanded graphite sheet having a width of 48 mm, a length of 212 mm, and a thickness of 0.38 mm (the weight of the expanded graphite sheet being 4.2 g) was prepared separately, and the heat-resistant sheet member in which the heat-resistant coating with a uniform thickness of 0.15 g/100 $cm^2$ was provided on the overall surfaces of the expanded graphite sheet was fabricated separately. By using a lubricating composition similar to the one used in the above-described Example 4, the lubricating sliding layer constituted by the lubricating composition was formed on the surface of the heat-resistant coating on one surface of the heat-resistant sheet member, and the sliding-surface forming member was subsequently fabricated in the same method as the one used in Example 1. Subsequently, the spherical annular seal member 54 was fabricated in the same method as the one used in Example 1. The weight ratio between the heat-resistant material composition constituted of the expanded graphite sheet and aluminum phosphate for forming the heat-resistant coating in this spherical annular seal member was 100 to 5.8 in terms of the ratio of the heat-resistant material to aluminum phosphate in the same way as in the above-described Example 2.

EXAMPLE 6

The tubular base member was fabricated by using a heat-resistant sheet member similar to the one used in the above-described Example 3 (a heat-resistant sheet member provided with the heat-resistant coating having a uniform thickness of 0.3 g/100 cm$^2$ on the overall surfaces of the expanded graphite sheet). As another heat-resistant sheet member, in the same way as in the above-described Example 2, an expanded graphite sheet having a width of 48 mm, a length of 212 mm, and a thickness of 0.38 mm (the weight of the expanded graphite sheet being 4.2 g) was prepared separately, and the heat-resistant sheet member in which the heat-resistant coating with a uniform thickness of 0.3 g/100 cm$^2$ was provided on the overall surfaces of the expanded graphite sheet was fabricated separately. By using a lubricating composition similar to the one used in the above-described Example 4, the lubricating sliding layer constituted by the lubricating composition was formed on the surface of the heat-resistant coating on one surface of the heat-resistant sheet member, and the sliding-surface forming member was subsequently fabricated in the same method as the one used in Example 1. Subsequently, the spherical annular seal member 54 was fabricated in the same method as the one used in Example 1. The weight ratio between the heat-resistant material composition constituted of the expanded graphite sheet and aluminum phosphate for forming the heat-resistant coating in this spherical annular seal member was 100 to 11.5 in terms of the ratio of the heat-resistant material to aluminum phosphate in the same way as in the above-described Example 3.

EXAMPLE 7

As a heat-resistant sheet member, an expanded graphite sheet similar to the one used in Example 1 was prepared. An aqueous solution of aluminum primary phosphate (Al$_2$O$_3$.3P$_2$O$_5$.6H$_2$O) of a 25% concentration was prepared, and a mixture in which 15 g of graphite powder with an average particle size of 18 μm was compounded with 30 g of this aqueous solution was obtained. The overall surfaces of the aforementioned expanded graphite sheet were coated with this mixture by roller coating, and the thus-coated expanded graphite sheet was then allowed to dry for 20 minutes at a temperature of 150° C. in the drying furnace so as to form the heat-resistant coating (the weight ratio between graphite and aluminum phosphate being 1:0.5) with a uniform thickness of 0.3 g/100 cm$^2$ on the overall surfaces of the expanded graphite sheet. The sheet thus obtained was used as the heat-resistant sheet member provided with the heat-resistant coating.

By using this heat-resistant sheet member and a belt-shaped metal wire net similar to that of Example 1, the tubular base member was fabricated in the same way as in Example 1.

An expanded graphite sheet similar to the one in Example 1 was prepared separately, and another heat-resistant sheet member was fabricated separately in which, by using the aforementioned mixture, the heat-resistant coating (the weight ratio between graphite and aluminum phosphate being 1:0.5) with a uniform thickness of 0.3 g/100 cm$^2$ was formed on the overall surfaces of the expanded graphite sheet in the same method. By the same method as the one used in Example 1, a similar lubricating sliding layer was formed on the surface of the heat-resistant coating on one surface of the heat-resistant sheet member. Then, by using a belt-shaped metal wire net similar to the one described above, a similar sliding-surface forming member was fabricated in the same method as the one used in Example 1.

Subsequently, the spherical annular seal member 54, which had the cylindrical inner surface 52 defining the through hole 51 in its center and whose outer surface 53 was formed in the shape of the partially convex spherical surface, was fabricated. The weight ratio between, on the one hand, the heat-resistant material constituted of the expanded graphite sheet and, on the other hand, graphite and aluminum phosphate for forming the heat-resistant coating in this spherical annular seal member was 100 to 11.5 in terms of the ratio of the heat-resistant material to the heat-resistant coating (7.7 for graphite and 3.8 for aluminum phosphate).

EXAMPLE 8

As a heat-resistant sheet member, an expanded graphite sheet (the same as in Example 1, the weight of the expanded graphite sheet being 17.0 g) with a width of 55 mm, a length of 550 mm, and a thickness of 0.38 mm was prepared. An aqueous solution of aluminum primary phosphate of a 25% concentration was prepared, and a mixture in which 15 g of graphite powder with an average particle size of 18 μm was compounded with 30 g of this aqueous solution was obtained. The operation of coating the overall surfaces of the aforementioned expanded graphite sheet with this mixture by roller coating was repeated twice, and the thus-coated expanded graphite sheet was then allowed to dry for 20 minutes at a temperature of 150° C. in the drying furnace so as to form the heat-resistant coating (the weight ratio between graphite and aluminum phosphate being 1:0.5) with a uniform thickness of 0.5 g/100 cm$^2$ on the overall surfaces of the expanded graphite sheet. The sheet thus obtained was used as the heat-resistant sheet member provided with the heat-resistant coating.

A reinforcing member similar to the one used in Example 1 was prepared, and the tubular base member was fabricated from the reinforcing member and the heat-resistant sheet member in the same way as in Example 1. As another heat-resistant sheet member, an expanded graphite sheet similar to the one in Example 1 (the weight of the expanded graphite sheet being 4.2 g) and having a width of 48 mm, a length of 212 mm, and a thickness of 0.38 mm was prepared separately. The operation of coating the overall surfaces of the expanded graphite sheet with the aforementioned mixture by roller coating was repeated twice, and the thus-coated expanded graphite sheet was then allowed to dry for 20 minutes at a temperature of 150° C. in the drying furnace. Consequently, the heat-resistant sheet member, in which the heat-resistant coating (the weight ratio between graphite and aluminum phosphate being 1:0.5) with a uniform thickness of 0.5 g/100 cm$^2$ was formed on the overall surfaces of the expanded graphite sheet, was fabricated separately.

By using a lubricating composition similar to the one used in Example 1, the lubricating sliding layer was formed on the surface of the heat-resistant coating on one surface of the heat-resistant sheet member. Subsequently, the sliding-surface forming member was fabricated in the same way as in Example 1, and the spherical annular seal member was similarly fabricated in the same method as the one used in Example 1. The weight ratio between, on the one hand, the heat-resistant material composition constituted of the expanded graphite sheet and, on the other hand, graphite and aluminum phosphate for forming the heat-resistant coating in this spherical annular seal member was 100 to 19.2 in terms of the ratio of the heat-resistant material to the heat-resistant coating (12.8 for graphite and 6.4 for aluminum phosphate).

EXAMPLE 9

A tubular base member similar to the one in the above-described Example 7 was fabricated.

As the heat-resistant sheet member, an expanded graphite sheet similar to that of the above-described Example 1 and having a width of 48 mm, a length of 212 mm, and a thickness of 0.38 mm (the weight of the expanded graphite sheet being 4.2 g) was fabricated separately. By using a mixture similar to that of the above-described Example 7, the heat-resistant sheet member, in which the heat-resistant coating (the weight ratio between graphite and aluminum phosphate being 1:0.5) with a uniform thickness of 0.3 g/100 cm² was formed on the overall surfaces of the expanded graphite sheet in the same method, was fabricated separately. Subsequently, an aqueous dispersion (17 wt. % of boron nitride, 10 wt. % of alumina, 10 wt. % of polytetrafluoroethylene resin, and 70 wt. % of water) containing as a solid content 30 wt. % of a lubricating composition (56.7 wt. % of boron nitride, 10 wt. % of alumina, and 33.3 wt. % of polytetrafluoroethylene resin), in which a lubricating composition constituted of 85 wt. % of boron nitride powder with an average particle size of 7 µm and 15 wt. % of alumina powder with an average particle size of 0.6 µm was set as 100 parts by weight, and which further contained 50 parts by weight of polytetrafluoroethylene resin powder with an average particle size of 0.3 µm, was applied to the surface of the heat-resistant coating on one surface of the heat-resistant sheet member by means of roller coating, and was then dried. This coating operation was repeated three times to form the lubricating sliding layer constituted by the lubricating composition. Subsequently, the sliding-surface forming member was fabricated in the same way as in Example 1, and the spherical annular seal member was then fabricated in the same method as the one used in Example 1. The weight ratio between, on the one hand, the heat-resistant material composition constituted of the expanded graphite sheet and, on the other hand, graphite and aluminum phosphate for forming the heat-resistant coating in this spherical annular seal member was 100 to 11.5 in terms of the ratio of the heat-resistant material to the heat-resistant coating (7.7 for graphite and 3.8 for aluminum phosphate).

EXAMPLE 10

A tubular base member similar to the one in the above-described Example 7 was fabricated.

As the heat-resistant sheet member, an expanded graphite sheet similar to that of the above-described Example 1 and having a width of 48 mm, a length of 212 mm, and a thickness of 0.38 mm (the weight of the expanded graphite sheet being 4.2 g) was fabricated separately. By using a mixture similar to that of the above-described Example 7, the heat-resistant sheet member, in which the heat-resistant coating (the weight ratio between graphite and aluminum phosphate being 1:0.5) with a uniform thickness of 0.5 g/100 cm² was formed on the overall surfaces of the expanded graphite sheet in the same method, was fabricated separately. Subsequently, an aqueous dispersion (17 wt. % of boron nitride, 10 wt. % of alumina, 10 wt. % of polytetrafluoroethylene resin, and 70 wt. % of water) containing as a solid content 30 wt. % of a lubricating composition (56.7 wt. % of boron nitride, 10 wt. % of alumina, and 33.3 wt. % of polytetrafluoroethylene resin), in which a lubricating composition constituted of 85 wt. % of boron nitride powder with an average particle size of 7 µm and 15 wt. % of alumina powder with an average particle size of 0.6 µm was set as 100 parts by weight, and which further contained 50 parts by weight of polytetrafluoroethylene resin powder with an average particle size of 0.3 µm, was applied to the surface of the heat-resistant coating on one surface of the heat-resistant sheet member by means of roller coating, and was then dried. This coating operation was repeated three times to form the lubricating sliding layer constituted by the lubricating composition. Subsequently, the sliding-surface forming member was fabricated in the same way as in Example 1, and the spherical annular seal member was then fabricated in the same method as the one used in Example 1. The weight ratio between, on the one hand, the heat-resistant material composition constituted of the expanded graphite sheet and, on the other hand, graphite and aluminum phosphate for forming the heat-resistant coating in this spherical annular seal member was 100 to 19.2 in terms of the ratio of the heat-resistant material to the heat-resistant coating (12.8 for graphite and 6.4 for aluminum phosphate).

EXAMPLE 11

As a heat-resistant sheet member, an expanded graphite sheet (the same as in Example 1, the weight of the expanded graphite sheet being 17.0 g) with a width of 55 mm, a length of 550 mm, and a thickness of 0.38 mm was prepared. An aqueous solution of aluminum primary phosphate of a 25% concentration was prepared, and a mixture in which 7.5 g of graphite powder with an average particle size of 18 µm was compounded with 30 g of this aqueous solution was obtained. The overall surfaces of the aforementioned expanded graphite sheet were coated with this mixture, and the thus-coated expanded graphite sheet was then allowed to dry for 20 minutes at a temperature of 150° C. in the drying furnace so as to form the heat-resistant coating (the weight ratio between graphite and aluminum phosphate being 1:1) with a uniform thickness of 0.3 g/100 cm² on the overall surfaces of the expanded graphite sheet. The sheet thus obtained was used as the heat-resistant sheet member provided with the heat-resistant coating. Subsequently, the tubular base member was fabricated in the same way as in Example 1.

As another heat-resistant sheet member, an expanded graphite sheet having a width of 48 mm, a length of 212 mm, and a thickness of 0.38 mm (the weight of the expanded graphite sheet being 4.2 g) was prepared separately, and the heat-resistant sheet member was fabricated separately in which, by using the aforementioned mixture, the heat-resistant coating (the weight ratio between graphite and aluminum phosphate being 1:1) with a uniform thickness of 0.3 g/100 cm² was formed on the overall surfaces of the expanded graphite sheet in the same method as the one used in Example 7. By using a lubricating composition similar to the one used in Example 1, the lubricating sliding layer constituted by the lubricating composition was formed on the surface of the heat-resistant coating on one surface of the heat-resistant sheet member, and the sliding-surface forming member was then fabricated in the same method as the one used in Example 1. Subsequently, the spherical annular seal member was fabricated in the same method as the one used in Example 1. The weight ratio between, on the one hand, the heat-resistant material composition constituted of the expanded graphite sheet and, on the other hand, graphite and aluminum phosphate for forming the heat-resistant coating in this spherical annular seal member was 100 to 11.5 in terms of the ratio of the heat-resistant material to the heat-resistant coating (5.75 for graphite and 5.75 for aluminum phosphate).

EXAMPLE 12

As a heat-resistant sheet member, an expanded graphite sheet (the same as in Example 1, the weight of the expanded graphite sheet being 17.0 g) with a width of 55 mm, a length of 550 mm, and a thickness of 0.38 mm was prepared. An aqueous solution of aluminum primary phosphate of a 25% concentration was prepared, and a mixture in which 7.5 g of graphite powder with an average particle size of 18 $\mu$m was compounded with 30 g of this aqueous solution was obtained. The operation of coating the overall surfaces of the aforementioned expanded graphite sheet with this mixture by roller coating was repeated twice, and the thus-coated expanded graphite sheet was then allowed to dry for 20 minutes at a temperature of 150° C. in the drying furnace so as to form the heat-resistant coating (the weight ratio between graphite and aluminum phosphate being 1:1) with a uniform thickness of 0.5 g/100 cm$^2$ on the overall surfaces of the expanded graphite sheet. The sheet thus obtained was used as the heat-resistant sheet member provided with the heat-resistant coating. Subsequently, the tubular base member was fabricated in the same way as in Example 1.

As another heat-resistant sheet member, an expanded graphite sheet (the weight of the expanded graphite sheet being 4.2 g) having a width of 48 mm, a length of 212 mm, and a thickness of 0.38 mm was prepared separately. The operation of coating the overall surfaces of the expanded graphite sheet with the aforementioned mixture by roller coating was repeated twice, and the thus-coated expanded graphite sheet was then allowed to dry for 20 minutes at a temperature of 150° C. in the drying furnace. Consequently, the heat-resistant sheet member, in which the heat-resistant coating (the weight ratio between graphite and aluminum phosphate being 1:1) with a uniform thickness of 0.5 g/100 cm$^2$ was formed on the overall surfaces of the expanded graphite sheet, was fabricated separately. By using a lubricating composition similar to the one used in Example 1, the lubricating sliding layer was formed of the lubricating composition on the surface of the heat-resistant coating on one surface of the heat-resistant sheet member. Subsequently, the sliding-surface forming member was fabricated in the same method as the one used in Example 1, and the spherical annular seal member was similarly fabricated in the same method as the one used in Example 1. The weight ratio between, on the one hand, the heat-resistant material composition constituted of the expanded graphite sheet and, on the other hand, graphite and aluminum phosphate for forming the heat-resistant coating in this spherical annular seal member was 100 to 19.2 in terms of the ratio of the heat-resistant material to the heat-resistant coating (9.6 for graphite and 9.6 for aluminum phosphate).

EXAMPLE 13

As a heat-resistant sheet member, an expanded graphite sheet (the same as in Example 1, the weight of the expanded graphite sheet being 17.0 g) with a width of 55 mm, a length of 550 mm, and a thickness of 0.38 mm was prepared. An aqueous solution of aluminum primary phosphate of a 25% concentration was prepared, and a mixture in which 5 g of a metal fluoride (calcium fluoride) with an average particle size of 4 $\mu$m was compounded with 30 g of this aqueous solution was obtained. The overall surfaces of the aforementioned expanded graphite sheet were coated with this mixture, and the thus-coated expanded graphite sheet was then allowed to dry for 20 minutes at a temperature of 150° C. in the drying furnace so as to form the heat-resistant coating (the weight ratio between calcium fluoride and aluminum phosphate being 1:1.5) with a uniform thickness of 0.3 g/100 cm$^2$ on the overall surfaces of the expanded graphite sheet. The sheet thus obtained was used as the heat-resistant sheet member provided with the heat-resistant coating. Subsequently, the tubular base member was fabricated in the same way as in Example 1.

As another heat-resistant sheet member, an expanded graphite sheet having a width of 48 mm, a length of 212 mm, and a thickness of 0.38 mm (the weight of the expanded graphite sheet being 4.2 g) was prepared separately, and the heat-resistant sheet member was fabricated separately in which, by using the aforementioned mixture, the heat-resistant coating (the weight ratio between calcium fluoride and aluminum phosphate being 1:1.5) with a uniform thickness of 0.3 g/100 cm$^2$ was formed on the overall surfaces of the expanded graphite sheet in the same method. By using a lubricating composition similar to the one used in Example 1, the lubricating sliding layer constituted by the lubricating composition was formed on the surface of the heat-resistant coating on one surface of the heat-resistant sheet member, and the sliding-surface forming member was then fabricated in the same method as the one used in Example 1. Subsequently, the spherical annular seal member was fabricated in the same method as the one used in Example 1. The weight ratio between, on the one hand, the heat-resistant material composition constituted of the expanded graphite sheet and, on the other hand, calcium fluoride and aluminum phosphate for forming the heat-resistant coating in this spherical annular seal member was 100 to 11.5 in terms of the ratio of the heat-resistant material to the heat-resistant coating (4.6 for calcium fluoride and 6.9 for aluminum phosphate).

EXAMPLE 14

As a heat-resistant sheet member, an expanded graphite sheet (the same as in Example 1, the weight of the expanded graphite sheet being 17.0 g) with a width of 55 mm, a length of 550 mm, and a thickness of 0.38 mm was prepared. An aqueous solution of aluminum primary phosphate of a 25% concentration was prepared, and a mixture in which 5 g of a metal fluoride (calcium fluoride) with an average particle size of 4 $\mu$m was compounded with 30 g of this aqueous solution was obtained. The operation of coating the overall surfaces of the aforementioned expanded graphite sheet with this mixture was repeated twice, and the thus-coated expanded graphite sheet was then allowed to dry for 20 minutes at a temperature of 150° C. in the drying furnace so as to form the heat-resistant coating (the weight ratio between calcium fluoride and aluminum phosphate being 1:1.5) with a uniform thickness of 0.5 g/100 cm$^2$ on the overall surfaces of the expanded graphite sheet. The sheet thus obtained was used as the heat-resistant sheet member provided with the heat-resistant coating. Subsequently, the tubular base member was fabricated in the same way as in Example 1.

As another heat-resistant sheet member, an expanded graphite sheet having a width of 48 mm, a length of 212 mm, and a thickness of 0.38 mm (the weight of the expanded graphite sheet being 4.2 g) was prepared separately, and the heat-resistant sheet member was fabricated separately in which, by using the aforementioned mixture, the heat-resistant coating (the weight ratio between calcium fluoride and aluminum phosphate being 1:1.5) with a uniform thickness of 0.5 g/100 cm² was formed on the overall surfaces of the expanded graphite sheet in the same method. By using a lubricating composition similar to the one used in Example 9, the lubricating sliding layer constituted by the lubricating composition was formed on the surface of the heat-resistant coating on one surface of the heat-resistant sheet member, and the sliding-surface forming member was then fabricated in the same method as the one used in Example 1. Subsequently, the spherical annular seal member was fabricated in the same method as the one used in Example 1. The weight ratio between, on the one hand, the heat-resistant material composition constituted of the expanded graphite sheet and, on the other hand, calcium fluoride and aluminum phosphate for forming the heat-resistant coating in this spherical annular seal member 100 to 19.2 between the heat-resistant material to the heat-resistant coating (7.7 for calcium fluoride and 11.5 for aluminum phosphate).

EXAMPLE 15

As a heat-resistant sheet member, an expanded graphite sheet (the same as in Example 1, the weight of the expanded graphite sheet being 17.0 g) with a width of 55 mm, a length of 550 mm, and a thickness of 0.38 mm was prepared. An aqueous solution of aluminum primary phosphate of a 25% concentration was prepared, and a mixture in which 5 g of a metal fluoride (lithium fluoride) with an average particle size of 4 μm was compounded with 30 g of this aqueous solution was obtained. The overall surfaces of the aforementioned expanded graphite sheet were coated with this mixture, and the thus-coated expanded graphite sheet was then allowed to dry for 20 minutes at a temperature of 150° C. in the drying furnace so as to form the heat-resistant coating (the weight ratio between lithium fluoride and aluminum phosphate being 1:1.5) with a uniform thickness of 0.3 g/100 cm² on the overall surfaces of the expanded graphite sheet. The sheet thus obtained was used as the heat-resistant sheet member provided with the heat-resistant coating. Subsequently, the tubular base member was fabricated in the same way as in Example 1.

As another heat-resistant sheet member, an expanded graphite sheet having a width of 48 mm, a length of 212 mm, and a thickness of 0.38 mm (the weight of the expanded graphite sheet being 4.2 g) was prepared separately, and the heat-resistant sheet member was fabricated separately in which, by using the aforementioned mixture, the heat-resistant coating (the weight ratio between lithium fluoride and aluminum phosphate being 1:1.5) with a uniform thickness of 0.3 g/100 cm² was formed on the overall surfaces of the expanded graphite sheet in the same method. By using a lubricating composition similar to the one used in Example 1, the lubricating sliding layer constituted by the lubricating composition was formed on the surface of the heat-resistant coating on one surface of the heat-resistant sheet member, and the sliding-surface forming member was then fabricated in the same method as the one used in Example 1. Subsequently, the spherical annular seal member was fabricated in the same method as the one used in Example 1. The weight ratio between, on the one hand, the heat-resistant material composition constituted of the expanded graphite sheet and, on the other hand, lithium fluoride and aluminum phosphate for forming the heat-resistant coating in this spherical annular seal member was 100 to 11.5 between the heat-resistant material to the heat-resistant coating (4.6 for lithium fluoride and 6.9 for aluminum phosphate).

EXAMPLE 16

As a heat-resistant sheet member, an expanded graphite sheet (the same as in Example 1, the weight of the expanded graphite sheet being 17.0 g) with a width of 55 mm, a length of 550 mm, and a thickness of 0.38 mm was prepared. An aqueous solution of aluminum primary phosphate of a 25% concentration was prepared, and a mixture in which 5 g of a metal fluoride (lithium fluoride) with an average particle size of 4 μm was compounded with 30 g of this aqueous solution was obtained. The operation of coating the overall surfaces of the aforementioned expanded graphite sheet with this mixture was repeated twice, and the thus-coated expanded graphite sheet was then allowed to dry for 20 minutes at a temperature of 150° C. in the drying furnace so as to form the heat-resistant coating (the weight ratio between lithium fluoride and aluminum phosphate being 1:1.5) with a uniform thickness of 0.5 g/100 cm² on the overall surfaces of the expanded graphite sheet. The sheet thus obtained was used as the heat-resistant sheet member provided with the heat-resistant coating. Subsequently, the tubular base member was fabricated in the same way as in Example 1.

As another heat-resistant sheet member, an expanded graphite sheet having a width of 48 mm, a length of 212 mm, and a thickness of 0.38 mm (the weight of the expanded graphite sheet being 4.2 g) was prepared separately, and the heat-resistant sheet member was fabricated separately in which, by using the aforementioned mixture, the heat-resistant coating (the weight ratio between lithium fluoride and aluminum phosphate being 1:1.5) with a uniform thickness of 0.5 g/100 cm² was formed on the overall surfaces of the expanded graphite sheet in the same method. By using a lubricating composition similar to the one used in Example 9, the lubricating sliding layer constituted by the lubricating composition was formed on the surface of the heat-resistant coating on one surface of the heat-resistant sheet member, and the sliding-surface forming member was then fabricated in the same method as the one used in Example 1. Subsequently, the spherical annular seal member was fabricated in the same method as the one used in Example 1. The weight ratio between, on the one hand, the heat-resistant material composition constituted of the expanded graphite sheet and, on the other hand, lithium fluoride and aluminum phosphate for forming the heat-resistant coating in this spherical annular seal member was 100 to 19.2 in terms of the ratio of the heat-resistant material to the heat-resistant coating (7.7 for lithium fluoride and 11.5 for aluminum phosphate).

EXAMPLE 17

As a heat-resistant sheet member, an expanded graphite sheet (the same as in Example 1, the weight of the expanded graphite sheet being 17.0 g) with a width of 55 mm, a length of 550 mm, and a thickness of 0.38 mm was prepared. An aqueous solution of aluminum primary phosphate of a 25% concentration was prepared, and a mixture in which 7.5 g of graphite powder with an average particle size of 18 μm and 7.5 g of a metal fluoride (calcium fluoride) with an average particle size of 4 μm were compounded with 30 g of this aqueous solution was obtained. The overall surfaces of the aforementioned expanded graphite sheet were coated with this mixture, and the thus-coated expanded graphite sheet was then allowed to dry for 20 minutes at a temperature of 150° C. in the drying furnace so as to form the heat-resistant coating (the weight ratio between, on the one hand, graphite and calcium fluoride and, on the other hand, aluminum phosphate being 1:0.5) with a uniform thickness of 0.3 g/100 cm² on the overall surfaces of the expanded graphite sheet. The sheet thus obtained was used as the heat-resistant sheet member provided with the heat-resistant coating.

Subsequently, the tubular base member was fabricated in the same way as in Example 1.

As another heat-resistant sheet member, an expanded graphite sheet having a width of 48 mm, a length of 212 mm, and a thickness of 0.38 mm (the weight of the expanded graphite sheet being 4.2 g) was prepared separately, and the heat-resistant sheet member was fabricated separately in which, by using the aforementioned mixture, the heat-resistant coating (the weight ratio between, on the one hand, graphite and calcium fluoride and, on the other hand, aluminum phosphate being 1:0.5) with a uniform thickness of 0.3 g/100 cm$^2$ was formed on the overall surfaces of the expanded graphite sheet in the same method. By using a lubricating composition similar to the one used in Example 1, the lubricating sliding layer constituted by the lubricating composition was formed on the surface of the heat-resistant coating on one surface of the heat-resistant sheet member, and the sliding-surface forming member was then fabricated in the same method as the one used in Example 1. Subsequently, the spherical annular seal member was fabricated in the same method as the one used in Example 1. The weight ratio between, on the one hand, the heat-resistant material composition constituted of the expanded graphite sheet and, on the other hand, graphite, calcium fluoride, and aluminum phosphate for forming the heat-resistant coating in this spherical annular seal member was 100 to 11.5 in terms of the ratio of the heat-resistant material to the heat-resistant coating (3.83 for graphite, 3.83 for calcium fluoride, and 3.83 for aluminum phosphate).

EXAMPLE 18

As a heat-resistant sheet member, an expanded graphite sheet (the same as in Example 1, the weight of the expanded graphite sheet being 17.0 g) with a width of 55 mm, a length of 550 mm, and a thickness of 0.38 mm was prepared. An aqueous solution of aluminum primary phosphate of a 25% concentration was prepared, and a mixture in which 7.5 g of graphite powder with an average particle size of 18 μm and 7.5 g of a metal fluoride (calcium fluoride) with an average particle size of 4 μm were compounded with 30 g of this aqueous solution was obtained. The operation of coating the overall surfaces of the aforementioned expanded graphite sheet with this mixture was repeated twice, and the thus-coated expanded graphite sheet was then allowed to dry for 20 minutes at a temperature of 150° C. in the drying furnace so as to form the heat-resistant coating (the weight ratio between, on the one hand, graphite and calcium fluoride and, on the other hand, aluminum phosphate being 1:0.5) with a uniform thickness of 0.5 g/100 cm$^2$ on the overall surfaces of the expanded graphite sheet. The sheet thus obtained was used as the heat-resistant sheet member provided with the heat-resistant coating. Subsequently, the tubular base member was fabricated in the same way as in Example 1.

As another heat-resistant sheet member, an expanded graphite sheet having a width of 48 mm, a length of 212 mm, and a thickness of 0.38 mm (the weight of the expanded graphite sheet being 4.2 g) was prepared separately, and the heat-resistant sheet member was fabricated separately in which, by using a mixture similar to the above-described Example 17, the heat-resistant coating (the weight ratio between, on the one hand, graphite and calcium fluoride and, on the other hand, aluminum phosphate being 1:0.5) with a uniform thickness of 0.5 g/100 cm$^2$ was formed on the overall surfaces of the expanded graphite sheet in the same method. By using a lubricating composition similar to the one used in Example 9, the lubricating sliding layer constituted by the lubricating composition was formed on the surface of the heat-resistant coating on one surface of the heat-resistant sheet member, and the sliding-surface forming member was then fabricated in the same method as the one used in Example 1. Subsequently, the spherical annular seal member was fabricated in the same method as the one used in Example 1. The weight ratio between, on the one hand, the heat-resistant material composition constituted of the expanded graphite sheet and, on the other hand, graphite, calcium fluoride, and aluminum phosphate for forming the heat-resistant coating in this spherical annular seal member was 100 to 19.2 in terms of the ratio of the heat-resistant material to the heat-resistant coating (6.4 for graphite, 6.4 for calcium fluoride, and 6.4 for aluminum phosphate).

EXAMPLE 19

As a heat-resistant sheet member, an expanded graphite sheet (the same as in Example 1, the weight of the expanded graphite sheet being 17.0 g) with a width of 55 mm, a length of 550 mm, and a thickness of 0.38 mm was prepared. An aqueous solution of aluminum primary phosphate of a 25% concentration was prepared, and a mixture in which 7.5 g of graphite powder with an average particle size of 18 μm was compounded with 30 g of this aqueous solution was obtained. The overall surfaces of the aforementioned expanded graphite sheet were coated with this mixture by roller coating, and the thus-coated expanded graphite sheet was then allowed to dry for 20 minutes at a temperature of 150° C. in the drying furnace so as to form the heat-resistant coating (the weight ratio between graphite and aluminum phosphate being 1:1) with a uniform thickness of 0.3 g/100 cm$^2$ on the overall surfaces of the expanded graphite sheet. The sheet thus obtained was used as the heat-resistant sheet member provided with the heat-resistant coating. Subsequently, the tubular base member was fabricated in the same way as in Example 1.

As another heat-resistant sheet member, an expanded graphite sheet having a width of 48 mm, a length of 212 mm, and a thickness of 0.38 mm (the weight of the expanded graphite sheet being 4.2 g) was prepared separately. An aqueous solution of aluminum primary phosphate of a 25% concentration was prepared, and a mixture in which 3.75 g of graphite powder with an average particle size of 18 μm and 3.75 g of calcium fluoride with an average particle size of 4 μm were compounded with 30 g of this aqueous solution was obtained. The overall surfaces of the aforementioned expanded graphite sheet were coated with this mixture, and the thus-coated expanded graphite sheet was then allowed to dry for 20 minutes at a temperature of 150° C. in the drying furnace so as to form the heat-resistant coating (the weight ratio between, on the one hand, graphite and calcium fluoride and, on the other hand, aluminum phosphate being 1:1) with a uniform thickness of 0.3 g/100 cm$^2$ on the overall surfaces of the expanded graphite sheet. The sheet thus obtained was used as the heat-resistant sheet member provided with the heat-resistant coating. By using a lubricating composition similar to the one used in Example 1, the lubricating sliding layer constituted by the lubricating composition was formed on the surface of the heat-resistant coating on one surface of the heat-resistant sheet member, and the sliding-surface forming member was then fabricated in the same method as the one used in Example 1. Subsequently, the spherical annular seal member was fabricated in the same method as the one used in Example 1. The weight ratio between, on the one hand, the heat-resistant material composition constituted of the expanded graphite sheet and, on the other hand, graphite, calcium fluoride, and aluminum phosphate for forming the heat-resistant coating in this spherical annular seal member was 100 to 11.5 between the heat-resistant material to the heat-resistant coating (4.3 for graphite, 1.4 for calcium fluoride, and 5.8 for aluminum phosphate).

EXAMPLE 20

As a heat-resistant sheet member, an expanded graphite sheet (the same as in Example 1, the weight of the expanded graphite sheet being 17.0 g) with a width of 55 mm, a length of 550 mm, and a thickness of 0.38 mm was prepared. An aqueous solution of aluminum primary phosphate of a 25% concentration was prepared, and a mixture in which 7.5 g of graphite powder with an average particle size of 18 $\mu$m was compounded with 30 g of this aqueous solution was obtained. The operation of coating the overall surfaces of the aforementioned expanded graphite sheet with this mixture by roller coating was repeated twice, and the thus-coated expanded graphite sheet was then allowed to dry for 20 minutes at a temperature of 150° C. in the drying furnace so as to form the heat-resistant coating (the weight ratio between graphite and aluminum phosphate being 1:1) with a uniform thickness of 0.5 g/100 cm$^2$ on the overall surfaces of the expanded graphite sheet. The sheet thus obtained was used as the heat-resistant sheet member provided with the heat-resistant coating. Subsequently, by using this heat-resistant sheet member, the tubular base member was fabricated in the same way as in Example 1.

As another heat-resistant sheet member, an expanded graphite sheet having a width of 48 mm, a length of 212 mm, and a thickness of 0.38 mm (the weight of the expanded graphite sheet being 4.2 g) was prepared separately. An aqueous solution of aluminum primary phosphate of a 25% concentration was prepared, and a mixture in which 3.75 g of graphite powder with an average particle size of 18 $\mu$m and 3.75 g of calcium fluoride with an average particle size of 4 $\mu$m were compounded with 30 g of this aqueous solution was obtained. The operation of coating the overall surfaces of the aforementioned expanded graphite sheet with this mixture was repeated twice, and the thus-coated expanded graphite sheet was then allowed to dry for 20 minutes at a temperature of 150° C. in the drying furnace so as to form the heat-resistant coating (the weight ratio between, on the one hand, graphite and calcium fluoride and, on the other hand, aluminum phosphate being 1:1) with a uniform thickness of 0.5 g/100 cm$^2$ on the overall surfaces of the expanded graphite sheet. The sheet thus obtained was used as the heat-resistant sheet member provided with the heat-resistant coating. By using a lubricating composition similar to the one used in Example 9, the lubricating sliding layer constituted by the lubricating composition was formed on the surface of the heat-resistant coating on one surface of the heat-resistant sheet member, and the sliding-surface forming member was then fabricated in the same method as the one used in Example 1. Subsequently, the spherical annular seal member was fabricated in the same method as the one used in Example 1. The weight ratio between, on the one hand, the heat-resistant material composition constituted of the expanded graphite sheet and, on the other hand, graphite, calcium fluoride, and aluminum phosphate for forming the heat-resistant coating in this spherical annular seal member was 100 to 19.2 in terms of the ratio of the heat-resistant material to the heat-resistant coating (7.2 for graphite, 2.4 for calcium fluoride, and 9.6 for aluminum phosphate).

Comparative Example 1

An expanded graphite sheet (the same as in Example 1) with a width of 55 mm, a length of 550 mm, and a thickness of 0.38 mm was prepared as a heat-resistant sheet member, and a belt-shaped metal wire net (a width of 36 mm and a length of 360 mm) similar to the one used in Example 1 was used as a reinforcing member. The expanded graphite sheet and the reinforcing member were superposed one on top of the other, and a superposed assembly thereof was convoluted into a cylindrical shape with the expanded graphite sheet placed on the inner side, such that the expanded graphite sheet was exposed on the inner periphery and also on the outermost periphery, thereby preparing a tubular base member.

An aqueous solution (25.5 wt. % of boron nitride, 4.5 wt. % of alumina, and 70 wt. % of water) containing as a solid content 30 wt. % of a lubricating composition constituted of 85 wt. % of boron nitride powder with an average particle size of 7 $\mu$m and 15 wt. % of alumina powder with an average particle size of 0.6 $\mu$m, was applied to one surface of an expanded graphite sheet with a width of 48 mm, a length of 212 mm, and a thickness of 0.38 mm by means of roller coating, and was then dried. This coating operation was repeated three times to form a lubricating sliding layer constituted by the lubricating composition. Subsequently, the expanded graphite sheet having the lubricating sliding layer was inserted into a separately prepared belt-shaped metal wire net (a width of 53.5 mm and a length of 212 mm), and an assembly thereof was passed between the pair of rollers so as to be formed integrally, thereby fabricating a sliding-surface forming member on one surface of which the lubricating composition and the metal wire net were present in mixed form.

After a cylindrical preform was fabricated by winding the sliding-surface forming member around an outer peripheral surface of the aforementioned tubular base member with the lubricating sliding layer placed on the outer side, a spherical annular seal member, which had a cylindrical inner surface defining a through hole in its center as well as an outer surface formed in the shape of a partially convex spherical surface, was fabricated in the same method as the one used in the above-described Example 1.

Comparative Example 2

A tubular base member similar to that of the above-described Example 1 was fabricated.

An aqueous dispersion (17.0 wt. % of boron nitride, 3.0 wt. % of alumina, 10.0 wt. % of polytetrafluoroethylene resin, and 70 wt. % of water) containing as a solid content 30 wt. % of a lubricating composition (56.7 wt. % of boron nitride, 10 wt. % of alumina, and 33.3 wt. % of polytetrafluoroethylene resin), in which a lubricating composition constituted of 85 wt. % of boron nitride powder with an average particle size of 7 $\mu$m and 15 wt. % of alumina powder with an average particle size of 0.6 $\mu$m was set as 100 parts by weight, and which further contained 50 parts by weight of polytetrafluoroethylene resin powder with an average particle size of 0.3 $\mu$m, was applied to one surface of an expanded graphite sheet with a width of 48 mm, a length of 212 mm, and a thickness of 0.38 mm by means of roller coating, and was then dried. This coating operation was repeated three times to form a lubricating sliding layer constituted by the lubricating composition. Subsequently, the expanded graphite sheet having the lubricating sliding layer was inserted into a separately prepared belt-shaped metal wire net (a width of 53.5 mm and a length of 212 mm), and an assembly thereof was passed between the pair of rollers so as to be formed integrally, thereby fabricating a sliding-surface forming member on one surface of which the lubricating composition and the metal wire net were present in mixed form.

After a cylindrical preform was fabricated by winding the sliding-surface forming member around an outer peripheral surface of the aforementioned tubular base member with the lubricating sliding layer placed on the outer side, a spherical annular seal member, which had a cylindrical inner surface defining a through hole in its center as well as an outer surface formed in the shape of a partially convex spherical surface, was fabricated in the same method as the one used in the above-described Example 1.

Then, with respect to the spherical annular seal members in accordance with the above-described Examples and Comparative Examples, tests were conducted for measurement of a frictional torque (kgf·cm) and for checking the presence or absence of the occurrence of abnormal noise and the amount of gas leakage for each cycle of the seal member by using the exhaust pipe joint shown in FIG. 12, and its results are discussed below.

[Test Conditions]

(Test I)

Pressing force using coil springs: 67 kgf

Angle of oscillation: ±3°

Frequency: 12 hertz

Ambient temperature (the outer surface temperature of the concave spherical surface portion 302 shown in FIG. 12): from room temperature (20° C.) to 500° C.

(Test II)

Pressing force using coil springs: 67 kgf

Angle of oscillation: ±3°

Frequency: 12 hertz

Ambient temperature (the outer surface temperature of the concave spherical surface portion 302 shown in FIG. 12): from room temperature (20° C.) to 650° C.

[Test Method] (both Tests I and II)

After 45,000 oscillating motions are performed by setting an oscillating motion at ±3° at a frequency of 12 hertz as a unit of oscillation, the ambient temperature is raised to 500° C. (Test I) or 650° C. (Test II) while continuing the oscillating motions (the number of oscillating motions during the temperature rise being 45,000). When the ambient temperature reached 500° C. or 650° C., 115,000 oscillating motions are performed. Finally, the ambient temperature is allowed to drop to room temperature while continuing the oscillating motions (the number of oscillating motions during the temperature drop being 45,000). The combined total of 250,000 oscillating motions is set as one cycle, and four cycles are performed.

In addition, the evaluation of the presence or absence of the occurrence of abnormal noise was conducted as follows.

Evaluation Code I: No abnormal noise occurred.

Evaluation Code II: Abnormal noise is slightly heard with the ear brought close to the test piece.

Evaluation Code III: Although the noise is generally difficult to discern from a fixed position (a position 1.5 m distant from the test piece) since it is blanketed by the noises of the living environment, the noise can be discerned as abnormal noise by a person engaged in the test.

Evaluation Code IV: The noise can be recognized as abnormal noise (unpleasant sound) by anybody from the fixed position.

As for the amount of gas leakage (litter/min), an opening of one exhaust pipe 100 connected to the exhaust pipe joint shown in FIG. 12 was closed, dry air was allowed to flow into the joint portion from the other exhaust pipe 300 under a pressure of 0.5 kgf/cm$^2$, and the amount of leakage from the joint portion (sliding contact portions between the outer surface 53 of the spherical annular seal member 54 and the concave spherical surface portion 302 of the flared portion 301, fitting portions between the cylindrical inner surface 52 of the spherical annular seal member 54 and the pipe end 101 of the exhaust pipe 100, and abutting portions between the end face 55 of the spherical annular seal member 54 and the flange 200 provided uprightly on the exhaust pipe 100) was measured four times in total, i.e., before the test start, after 250,000 oscillating motions, after 500,000 oscillating motions, and after 1,000,000 oscillating motions, by means of a flowmeter.

Tables 1 to 11 show the results of Tests I and II obtained by the above-described test method

TABLE 1

|  | Example 1 | | | | Example 2 | | | |
| --- | --- | --- | --- | --- | --- | --- | --- | --- |
|  | 1 | 2 | 3 | 4 | 1 | 2 | 3 | 4 |
| Frictional torque | | | | | | | | |
| Test: I | 89 | 92 | 86 | 93 | 90 | 92 | 87 | 95 |
| Test: II | 89 | 94 | 90 | 115 | 91 | 94 | 90 | 120 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.07 | 0.08 | 0.12 | 0.15 | 0.07 | 0.08 | 0.11 | 0.14 |
| Test: II | 0.08 | 0.09 | 0.26 | 0.40 | 0.08 | 0.08 | 0.24 | 0.35 |

TABLE 2

|  | Example 3 | | | | Example 4 | | | |
| --- | --- | --- | --- | --- | --- | --- | --- | --- |
|  | 1 | 2 | 3 | 4 | 1 | 2 | 3 | 4 |
| Frictional torque |  |  |  |  |  |  |  |  |
| Test: I | 89 | 91 | 87 | 89 | 80 | 85 | 85 | 90 |
| Test: II | 87 | 92 | 90 | 117 | 81 | 84 | 86 | 105 |
| Determination of abnormal noise |  |  |  |  |  |  |  |  |
| Test: I | I | I | I | I | I | I | I | I |
| Test: II | I | I | I | I | I | I | I | I |
| Amount of gas leakage |  |  |  |  |  |  |  |  |
| Test: I | 0.07 | 0.08 | 0.11 | 0.12 | 0.07 | 0.08 | 0.13 | 0.15 |
| Test: II | 0.08 | 0.09 | 0.23 | 0.30 | 0.08 | 0.08 | 0.20 | 0.38 |

TABLE 3

|  | Example 5 | | | | Example 6 | | | |
| --- | --- | --- | --- | --- | --- | --- | --- | --- |
|  | 1 | 2 | 3 | 4 | 1 | 2 | 3 | 4 |
| Frictional torque |  |  |  |  |  |  |  |  |
| Test: I | 80 | 85 | 85 | 89 | 80 | 86 | 85 | 88 |
| Test: II | 81 | 84 | 86 | 104 | 81 | 83 | 87 | 102 |
| Determination of abnormal noise |  |  |  |  |  |  |  |  |
| Test: I | I | I | I | I | I | I | I | I |
| Test: II | I | I | I | I | I | I | I | I |
| Amount of gas leakage |  |  |  |  |  |  |  |  |
| Test: I | 0.07 | 0.08 | 0.13 | 0.14 | 0.07 | 0.08 | 0.12 | 0.13 |
| Test: II | 0.08 | 0.09 | 0.20 | 0.34 | 0.08 | 0.09 | 0.19 | 0.31 |

TABLE 4

|  | Example 7 | | | | Example 8 | | | |
| --- | --- | --- | --- | --- | --- | --- | --- | --- |
|  | 1 | 2 | 3 | 4 | 1 | 2 | 3 | 4 |
| Frictional torque |  |  |  |  |  |  |  |  |
| Test: I | 89 | 92 | 86 | 95 | 90 | 92 | 87 | 95 |
| Test: II | 89 | 94 | 90 | 100 | 91 | 94 | 90 | 96 |
| Determination of abnormal noise |  |  |  |  |  |  |  |  |
| Test: I | I | I | I | I | I | I | I | I |
| Test: II | I | I | I | I | I | I | I | I |
| Amount of gas leakage |  |  |  |  |  |  |  |  |
| Test: I | 0.07 | 0.08 | 0.12 | 0.15 | 0.07 | 0.08 | 0.10 | 0.12 |
| Test: II | 0.08 | 0.09 | 0.14 | 0.24 | 0.08 | 0.08 | 0.12 | 0.20 |

TABLE 5

|  | Example 9 | | | | Example 10 | | | |
| --- | --- | --- | --- | --- | --- | --- | --- | --- |
|  | 1 | 2 | 3 | 4 | 1 | 2 | 3 | 4 |
| Frictional torque | | | | | | | | |
| Test: I | 78 | 83 | 78 | 95 | 78 | 83 | 78 | 100 |
| Test: II | 77 | 80 | 76 | 100 | 80 | 82 | 75 | 98 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.07 | 0.08 | 0.18 | 0.15 | 0.07 | 0.08 | 0.11 | 0.13 |
| Test: II | 0.08 | 0.09 | 0.17 | 0.25 | 0.08 | 0.08 | 0.18 | 0.23 |

TABLE 6

|  | Example 11 | | | | Example 12 | | | |
| --- | --- | --- | --- | --- | --- | --- | --- | --- |
|  | 1 | 2 | 3 | 4 | 1 | 2 | 3 | 4 |
| Frictional torque | | | | | | | | |
| Test: I | 89 | 92 | 86 | 102 | 90 | 92 | 87 | 95 |
| Test: II | 89 | 94 | 90 | 103 | 91 | 94 | 90 | 96 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.07 | 0.08 | 0.13 | 0.15 | 0.07 | 0.08 | 0.12 | 0.13 |
| Test: II | 0.08 | 0.09 | 0.17 | 0.26 | 0.08 | 0.08 | 0.14 | 0.21 |

TABLE 7

|  | Example 13 | | | | Example 14 | | | |
| --- | --- | --- | --- | --- | --- | --- | --- | --- |
|  | 1 | 2 | 3 | 4 | 1 | 2 | 3 | 4 |
| Frictional torque | | | | | | | | |
| Test: I | 89 | 92 | 86 | 103 | 78 | 82 | 79 | 101 |
| Test: II | 89 | 94 | 90 | 102 | 76 | 81 | 78 | 100 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.07 | 0.08 | 0.13 | 0.15 | 0.07 | 0.08 | 0.10 | 0.13 |
| Test: II | 0.08 | 0.09 | 0.15 | 0.26 | 0.08 | 0.08 | 0.13 | 0.20 |

TABLE 8

|  | Example 15 | | | | Example 16 | | | |
| --- | --- | --- | --- | --- | --- | --- | --- | --- |
|  | 1 | 2 | 3 | 4 | 1 | 2 | 3 | 4 |
| Frictional torque | | | | | | | | |
| Test: I | 89 | 92 | 86 | 103 | 80 | 79 | 77 | 102 |
| Test: II | 89 | 94 | 90 | 102 | 82 | 80 | 77 | 100 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.07 | 0.08 | 0.14 | 0.15 | 0.07 | 0.08 | 0.11 | 0.12 |
| Test: II | 0.08 | 0.09 | 0.17 | 0.24 | 0.08 | 0.08 | 0.13 | 0.20 |

TABLE 9

|  | Example 17 | | | | Example 18 | | | |
| --- | --- | --- | --- | --- | --- | --- | --- | --- |
|  | 1 | 2 | 3 | 4 | 1 | 2 | 3 | 4 |
| Frictional torque | | | | | | | | |
| Test: I | 89 | 92 | 86 | 105 | 80 | 77 | 77 | 102 |
| Test: II | 89 | 90 | 85 | 102 | 82 | 80 | 78 | 100 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.07 | 0.08 | 0.12 | 0.15 | 0.07 | 0.08 | 0.11 | 0.13 |
| Test: II | 0.08 | 0.09 | 0.17 | 0.25 | 0.08 | 0.08 | 0.16 | 0.21 |

TABLE 10

|  | Example 19 | | | | Example 20 | | | |
| --- | --- | --- | --- | --- | --- | --- | --- | --- |
|  | 1 | 2 | 3 | 4 | 1 | 2 | 3 | 4 |
| Frictional torque | | | | | | | | |
| Test: I | 89 | 92 | 86 | 100 | 78 | 75 | 77 | 102 |
| Test: II | 89 | 91 | 86 | 101 | 80 | 78 | 75 | 98 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.07 | 0.08 | 0.13 | 0.15 | 0.07 | 0.08 | 0.12 | 0.13 |
| Test: II | 0.08 | 0.09 | 0.17 | 0.25 | 0.08 | 0.08 | 0.15 | 0.21 |

TABLE 11

| | Comparative Example 1 | | | | Comparative Example 2 | | | |
|---|---|---|---|---|---|---|---|---|
| | 1 | 2 | 3 | 4 | 1 | 2 | 3 | 4 |
| Frictional torque | | | | | | | | |
| Test: I | 89 | 94 | 85 | 87 | 80 | 87 | 80 | 82 |
| Test: II | 89 | 96 | 90 | 126 | 80 | 90 | 86 | 120 |
| Determination of abnormal noise | | | | | | | | |
| Test: I | I | I | I | I | I | I | I | I |
| Test: II | I | I | I | I | I | I | I | I |
| Amount of gas leakage | | | | | | | | |
| Test: I | 0.07 | 0.08 | 0.11 | 0.15 | 0.07 | 0.07 | 0.10 | 0.15 |
| Test: II | 0.08 | 0.50 | 2.30 | 4.50 | 0.07 | 0.45 | 2.15 | 4.20 |

In the tables, number 1 shows the results when the number of oscillating motions was zero (before the test start), number 2 shows the results when the number of oscillating motions was 250,000, number 2 shows the results when the number of oscillating motions was 500,000, and number 4 shows the results when the number of oscillating motions was 1,000,000. From the results of Test I, no difference in performance was noted between Examples and Comparative Examples. In both groups, the frictional torque was low, no occurrence of abnormal noise was noted, and a satisfactory performance was displayed in the amount of gas leakage which was not more than 0.15 litter/min.

However, from the results of Test II, an obvious difference in performance was noted between Examples and Comparative Examples. That is, in the case of the spherical annular seal members in accordance with Comparative Examples, under the high-temperature condition of 650° C. at the outer surface of the concave spherical portion, as is apparent from the test results on the amount of gas leakage, oxidation of expanded graphite, i.e., the heat-resistant sheet member, progressed with an increase in the number of oscillating motions, a sudden wearing of the expanded graphite was noted when the number of oscillating motions exceeded 500,000, and the deformation of the shape and the like occurred, with the result that their function as seal members disappeared. On the other hand, in the case of the spherical annular seal members in accordance with Examples, heat-resistant coatings were formed on the overall surfaces of the heat-resistant sheet members. Since the heat resistance of the seal members themselves had been enhanced, even under the high-temperature condition of 650° C. at the outer surface of the concave spherical portion, the oxidation and wearing of the expanded graphite were suppressed to low levels, and their function as seal members were still demonstrated even if the number of oscillating motions exceeded 1,000,000.

What is claimed is:

1. A spherical annular seal member having a cylindrical inner surface defining a through hole in a central portion thereof and a partially-convex spherical annular outer surface, comprising:

an annular base portion having said cylindrical inner surface defining said through hole in a central portion thereof, said annular base portion comprising a first reinforcing member made from a compressed metal wire net and heat-resistant material compressed and filling meshes of said first reinforcing member as principal components in said annular base portion, said heat-resistant material containing an aluminum phosphate;

an annular outer portion provided unitarily on said annular base portion and having said partially convex spherical annular outer surface, said annular outer portion having a sliding layer, which comprises a lubricating composition including boron nitride and at least one of alumina and silica, and a second reinforcing member made from a further compressed metal wire net, said lubricating composition and said second reinforcing member mixed with each other forming a smooth outer surface, said annular outer portion is free from aluminum phosphate.

2. A spherical annular seal member according to claim 1, wherein said heat-resistant material and said aluminum phosphate are present in said annular base portion in a weight ratio of 2–15 parts of said aluminum phosphate to 100 parts of said heat-resistant material.

3. A spherical annular seal member according to claim 1, wherein said annular base portion further comprises at least one of graphite and a metal fluoride mixed with said aluminum phosphate in said heat-resistant material.

4. A spherical annular seal member according to claim 3, wherein said graphite, said metal fluoride, and said aluminum phosphate are present in the heat-resistant material in a weight ratio of 4–40 parts of said aluminum phosphate and at least one of said graphite and said metal fluoride to 100 parts of said heat-resistant material.

5. A spherical annular seal member according to claim 3, wherein said graphite and said aluminum phosphate are contained in said heat-resistant material in a weight ratio of 1:0.3–4.

6. A spherical annular seal member according to claim 3, wherein said metal fluoride and said aluminum phosphate are contained in said heat-resistant material in a weight ratio of 1:0.3–4.

7. A spherical annular seal member according to claim 3, wherein said graphite and said metal fluoride on the one hand, and said aluminum phosphate on the other hand, are contained in said heat-resistant material in a weight ratio of 1:0.5–3, and said graphite and said metal fluoride in that ratio are contained in said heat-resistant material in a proportion of 50–80 wt. % for said graphite and in a proportion of 20–50 wt. % for said metal fluoride.

8. A spherical annular seal member according to claim 3, wherein said metal fluoride is at least one selected from the group consisting of calcium fluoride, lithium fluoride, sodium fluoride, and barium fluoride.

9. A spherical annular seal member according to claim 1, wherein said lubricating composition comprises 70–90 wt. % of boron nitride and 10–30 wt. % of at least one of alumina and silica.

10. A spherical annular seal member according to claim 1, wherein said lubricating composition further comprises polytetrafluoroethylene resin.

11. A spherical annular seal member according to claim 10, wherein said lubricating composition comprises 100 parts by weight of boron nitride and at least one of alumina and silica, and not more than 200 parts by weight of polytetrafluoroethylene resin.

12. A spherical annular seal member according to claim 10, wherein said lubricating composition comprises 100 parts by weight of boron nitride and at least one of alumina and silica, and 50–150 parts by weight polytetrafluoroethylene resin.

13. A spherical annular seal member according to claim 1, wherein said heat-resistant material is at least one selected from a group consisting of expanded graphite, mica, and asbestos.

14. A spherical annular seal member which has a cylindrical inner surface defining a through hole in a central portion thereof and a partially-convex spherical annular outer surface, comprising:
an annular base portion having said cylindrical inner surface defining said through hole in a central portion thereof, said annular base portion comprising a heat-resistant sheet member having on the entire surfaces thereof a heat-resistant coating formed of aluminum phosphate, and a first reinforcing member made from a metal wire net, wherein heat-resistant sheet member and said first reinforcing member are compressed and intertwined with each other;
an annular outer portion provided unitarily on said annular base portion and having said partially convex spherical annular outer surface, said annular outer portion having a sliding layer which comprises a lubricating composition and a second reinforcing member made from a metal wire net, said lubricating composition comprising one of boron nitride and a mixture of boron nitride and polytetrafluoroethylene resin and at least one of alumina and silica, and an outer surface formed by said lubricating composition and said second reinforcing member, said annular outer portion is free from aluminum phosphate.

15. A spherical annular seal member according to claim 14, wherein said heat-resistant sheet member and said heat-resistant coating are contained in said annular base portion in a weight ratio of 2–15 parts of said heat-resistant coating to 100 parts of said heat-resistant sheet member.

16. A spherical annular seal member according to claim 14, wherein said heat-resistant sheet member is formed from heat-resistant material selected from the group consisting of expanded graphite, mica, and asbestos, and said heat-resistant coating has a uniform thickness of 0.05–0.3 g/100 cm$^2$ on the overall surfaces of said heat-resistant sheet member.

17. A spherical annular seal member according to claim 14, wherein said lubricating composition comprises 70–90 wt. % of boron nitride and 10–30 wt. % of at least one of alumina and silica.

18. A spherical annular seal member according to claim 14, wherein said lubricating composition further comprises polytetrafluoroethylene resin.

19. A spherical annular seal member according to claim 18, wherein said lubricating composition comprises 100 parts by weight of boron nitride and at least one of alumina and silica, and not more than 200 parts by weight of polytetrafluoroethylene resin.

20. A spherical annular seal member according to claim 18, wherein said lubricating composition comprises 100 parts by weight of boron nitride and at least one of alumina and silica, and 50–150 parts by weight of polytetrafluoroethylene resin.

21. A spherical annular seal member according to claim 14, wherein said heat-resistant coating comprises a mixture in which at least one of graphite and a metal fluoride is mixed with said aluminum phosphate.

22. A spherical annular seal member according to claim 21, wherein said heat-resistant sheet member and said heat-resistant coating are present in said annular base portion in a weight ratio of 4–40 parts of heat-resistant coating to 100 parts of heat-resistant sheet member.

23. A spherical annular seal member according to claim 21, wherein said heat-resistant coating comprises a mixture in which graphite and aluminum phosphate are present in a weight ratio of 1:0.3–4.

24. A spherical annular seal member according to claim 21, wherein said heat-resistant coating comprises a mixture in which metal fluoride and aluminum phosphate are present in a weight ratio of 1:0.3–4.

25. A spherical annular seal member according to claim 21, wherein said heat-resistant coating comprises a mixture in which graphite and metal fluoride on the one hand, and aluminum phosphate on the other hand, are present in a weight ratio of 1:0.5–3, and graphite and metal fluoride in that ratio are contained in a proportion of 50–80 wt. % for graphite and in a proportion of 20–50 wt. % for metal fluoride.

26. A spherical annular seal member according to claim 21, wherein said metal fluoride is at least one member selected from the group consisting of calcium fluoride, lithium fluoride, sodium fluoride, and barium fluoride.

27. A spherical annular seal member according to claim 21, wherein said lubricating composition comprises 70–90 wt. % of boron nitride and 10–30 wt. % of at least one of alumina and silica.

28. A spherical annular seal member according to claim 21, wherein said lubricating composition comprises 100 parts by weight of a sub-lubricating composition comprising 70–90 wt. % of boron nitride and 10–30 wt. % of at least one of alumina and silica, and not more than 200 parts by weight of polytetrafluoroethylene resin.

29. A spherical annular seal member according to claim 21, wherein said lubricating composition comprises 100 parts by weight of a sub-lubricating composition comprising 70–90 wt. % of boron nitride and 10–30 wt. % of at least one of alumina and silica, and 50–150 parts by weight of polytetrafluoroethylene resin.

30. A spherical annular seal member according to claim 14, wherein said heat-resistant sheet member is formed from at least one member selected from the group consisting of expanded graphite, mica, and asbestos.

31. A method of manufacturing a spherical annular seal member which has a cylindrical inner surface defining a through hole in a central portion thereof as well as an outer surface formed in the shape of a partially convex spherical annular surface comprising an annular base portion having said cylindrical inner surface defining said through hole in a central portion thereof, said annular base portion comprising a heat-resistant sheet member having on the entire surfaces thereof a heat-resistant coating formed of aluminum phosphate, and a first reinforcing member made from a metal wire net, wherein heat-resistant sheet member and said first reinforcing sheet member are compressed and intertwined with each other;
an annular outer portion provided unitarily on said annular base portion and having said partially convex spherical annular outer shape, said annular outer portion having a sliding layer which comprises a lubricating composition and a second reinforcing member made from a metal wire net, said lubricating composition comprising one of boron nitride and a mixture of boron nitride and polytetrafluoroethylene resin and at least one of alumina and silica, and an outer surface formed by said lubricating composition and said second reinforcing member, and which is used particularly in an exhaust pipe joint, comprising the steps of:

(a) preparing a heat-resistant sheet member having on overall surfaces thereof a heat-resistant coating having a uniform thickness and formed of aluminum phosphate;

(b) preparing a reinforcing member made from a metal wire net obtained by weaving or knitting fine metal wires, superposing said reinforcing member on said heat-resistant sheet member, and convoluting a superposed assembly of said reinforcing member and said heat-resistant sheet member into a cylindrical shape with said heat-resistant sheet member placed on an inner side, so as to form a tubular base member;

(c) preparing another heat-resistant sheet member having on overall surfaces thereof a heat-resistant coating having a uniform thickness and formed of aluminum phosphate, and forming a sliding-surface forming member which includes said another heat-resistant sheet member, a sliding layer coated on a surface of said heat-resistant coating on one surface of said another heat-resistant sheet member and formed of a lubricating composition constituted of one of boron nitride and a mixture of boron nitride and polytetrafluoroethylene resin and at least one of alumina and silica, and a reinforcing member made from a metal wire net disposed in such a manner as to coat said sliding layer;

(d) winding said sliding-surface forming member around an outer peripheral surface of said tubular base member with a sliding layer-side surface of said sliding-surface forming member facing an outer side, so as to form a cylindrical preform; and (e) fitting said cylindrical preform over an outer peripheral surface of a core of a die, placing said core into said die, and compression-forming said cylindrical preform in said die in an axial direction of said core, wherein, in an interior portion of an obtained spherical annular seal member, which extends from the cylindrical inner surface to a vicinity of the outer surface formed in the shape of the partially convex spherical surface, said heat-resistant sheet member having said heat-resistant coating and said reinforcing member made from the metal wire net are provided with structural integrity by being compressed and intertwined with each other, and the outer surface formed in the shape of the partially convex spherical surface is formed into a smooth sliding surface in which meshes of said reinforcing member are filled with said lubricating composition such that said said reinforcing member and said lubricating composition are formed integrally in mixed form, said annular outer portion is free from aluminum phosphate.

32. A method of manufacturing a spherical annular seal member according to claim 31, wherein said heat-resistant sheet member is constituted by a sheet member which is formed from heat-resistant material of at least one kind selected from expanded graphite, mica, and asbestos, and said heat-resistant coating is formed of aluminum phosphate which is formed with a uniform thickness of 0.05–0.3 g/100 cm$^2$ on the overall surfaces of said heat-resistant sheet member.

33. A method of manufacturing a spherical annular seal member according to claim 31, wherein said sliding-surface forming member includes said heat-resistant sheet member having on the overall surfaces thereof said heat-resistant coating having a uniform thickness of 0.05–0.3 g/100 cm$^2$ and formed of aluminum phosphate, said sliding layer formed of said lubricating composition constituted of one of boron nitride and the mixture of boron nitride and polytetrafluoroethylene resin and at least one of alumina and silica, and said reinforcing member made from the metal wire net disposed in such a manner as to coat said sliding layer.

34. A method of manufacturing a spherical annular seal member according to claim 31, wherein said heat-resistant coating provided on said heat-resistant sheet member prepared in the step (a) is formed by a mixture of aluminum phosphate and at least one of graphite and a metal fluoride, the step (b) includes a step of convoluting said heat-resistant sheet member into the cylindrical shape so as to form said tubular base member, and said heat-resistant coating provided on said another heat-resistant sheet member prepared in the step (c) is formed by a mixture of aluminum phosphate and at least one of graphite and a metal fluoride.

35. A method of manufacturing a spherical annular seal member according to claim 34, wherein said heat-resistant coating is formed by a mixture in which graphite and aluminum phosphate are contained in a weight ratio of 1:0.3–4, and said heat-resistant coating is formed with a uniform thickness of 0.1–0.8 g/100 cm$^2$ on the overall surfaces of said heat-resistant sheet member.

36. A method of manufacturing a spherical annular seal member according to claim 34, wherein said heat-resistant coating is formed by a mixture in which the metal fluoride and aluminum phosphate are contained in a weight ratio of 1:0.3–4, and said heat-resistant coating is formed with a uniform thickness of 0.1–0.8 g/100 cm$^2$ on the overall surfaces of said heat-resistant sheet member.

37. A method of manufacturing a spherical annular seal member according to claim 34, wherein said heat-resistant coating is formed by a mixture in which graphite and the metal fluoride on the one hand, and aluminum phosphate on the other hand, are contained in a weight ratio of 1:0.5–3, and graphite and the metal fluoride in this ratio are contained in a proportion of 50–80 wt. % for graphite and in a proportion of 20–50 wt. % for the metal fluoride, and said heat-resistant coating is formed with a uniform thickness of 0.1–0.8 g/100 cm$^2$ on the overall surfaces of said heat-resistant sheet member.

38. A method of manufacturing a spherical annular seal member according to claim 34, wherein the metal fluoride is of at least one kind selected from calcium fluoride, lithium fluoride, sodium fluoride, and barium fluoride.

39. A method of manufacturing a spherical annular seal member according to claim 34, wherein said sliding-surface forming member includes said heat-resistant sheet member having on the overall surfaces thereof said heat-resistant coating having a uniform thickness of 0.1–0.8 g/100 cm$^2$ and formed of a mixture of graphite and aluminum phosphate with a weight ratio of 1:0.3–4, said sliding layer formed of said lubricating composition constituted of one of boron nitride and the mixture of boron nitride and polytetrafluoroethylene resin and at least one of alumina and silica, and said reinforcing member made from the metal wire net disposed in such a manner as to coat said sliding layer.

40. A method of manufacturing a spherical annular seal member according to claim 34, wherein said sliding-surface forming member includes said heat-resistant sheet member having on the overall surfaces thereof said heat-resistant coating having a uniform thickness of 0.1–0.8 g/100 cm$^2$ and formed of a mixture of the metal fluoride and aluminum phosphate with a weight ratio of 1:0.3–4, said sliding layer formed of said lubricating composition constituted of one of boron nitride and the mixture of boron nitride and polytetrafluoroethylene resin and at least one of alumina and silica, and said reinforcing member made from the metal wire net disposed in such a manner as to coat said sliding layer.

41. A method of manufacturing a spherical annular seal member according to claim 34, wherein said sliding-surface forming member includes said heat-resistant sheet member having on the overall surfaces thereof said heat-resistant coating having a uniform thickness of 0.1–0.8 g/100 cm$^2$ and formed of a mixture of graphite and the metal fluoride on the one hand, and aluminum phosphate on the other, with a weight ratio of 1:0.5–3, graphite and the metal fluoride being contained in a proportion of 50–80 wt. % for graphite and in a proportion of 20–50 wt. % for the metal fluoride, said sliding layer formed of said lubricating composition constituted of one of boron nitride and the mixture of boron nitride and polytetrafluoroethylene resin and at least one of alumina and silica, and said reinforcing member made from the metal wire net disposed in such a manner as to coat said sliding layer.

42. A method of manufacturing a spherical annular seal member according to claim 31, wherein said lubricating composition is formed of 70–90 wt. % of boron nitride and 10–30 wt. % of at least one of alumina and silica.

43. A method of manufacturing a spherical annular seal member according to claim 31, wherein said lubricating composition contains 100 parts by weight of a lubricating composition formed of 70–90 wt. % of boron nitride and 10–30 wt. % of at least one of alumina and silica, and further contains polytetrafluoroethylene resin in a proportion of not more than 200 parts by weight.

44. A method of manufacturing a spherical annular seal member according to claim 31, wherein said lubricating composition contains 100 parts by weight of a lubricating composition formed of 70–90 wt. % of boron nitride and 10–30 wt. % of at least one of alumina and silica, and further contains polytetrafluoroethylene resin in a proportion of 50–150 parts by weight.

45. A method of manufacturing a spherical annular seal member according to claim 40, wherein the metal fluoride is of at least one kind selected from calcium fluoride, lithium fluoride, sodium fluoride, and barium fluoride.

46. A method of manufacturing a spherical annular seal member according to claim 31, wherein said heat-resistant sheet member is of at least one kind selected from expanded graphite, mica, and asbestos.

\* \* \* \* \*